US009869869B2

(12) United States Patent
Nagano et al.

(10) Patent No.: US 9,869,869 B2
(45) Date of Patent: Jan. 16, 2018

(54) MULTIPLE VIEW LIQUID CRYSTAL DISPLAY

(71) Applicant: MITSUBISHI ELECTRIC CORPORATION, Tokyo (JP)

(72) Inventors: Shingo Nagano, Tokyo (JP); Yoshimitsu Ishikawa, Tokyo (JP); Tetsuya Satake, Tokyo (JP)

(73) Assignee: Mitsubishi Electronic Corporation, Tokyo (JP)

( * ) Notice: Subject to any disclaimer, the term of this patent is extended or adjusted under 35 U.S.C. 154(b) by 170 days.

(21) Appl. No.: 14/173,559

(22) Filed: Feb. 5, 2014

(65) Prior Publication Data
US 2014/0218670 A1    Aug. 7, 2014

(30) Foreign Application Priority Data

Feb. 7, 2013  (JP) ................. 2013-022152

(51) Int. Cl.
*G02B 27/22*     (2006.01)
*G02F 1/1335*    (2006.01)
*G02F 1/1343*    (2006.01)

(52) U.S. Cl.
CPC ... *G02B 27/2214* (2013.01); *G02F 1/133512* (2013.01); *G02F 1/134363* (2013.01); *G02F 2001/134372* (2013.01)

(58) Field of Classification Search
CPC ......... G02F 1/133707; G02F 1/134363; G02F 1/133512; G02B 27/2214; H04N 13/0402
See application file for complete search history.

(56) References Cited

U.S. PATENT DOCUMENTS

| | | | | |
|---|---|---|---|---|
| 7,880,848 B2* | 2/2011 | Kimura | ............. | G02F 1/134363 349/114 |
| 8,077,281 B2* | 12/2011 | Taniguchi | ......... | G02F 1/134363 349/141 |
| 8,922,741 B2* | 12/2014 | Atarashiya | ........ | G02F 1/134363 349/139 |
| 9,323,112 B2* | 4/2016 | Matsushima | ..... | G02F 1/134309 |
| 2005/0128389 A1* | 6/2005 | Yang | .................. | G02F 1/134363 349/114 |
| 2013/0321752 A1* | 12/2013 | Asakawa | .............. | G02F 1/1337 349/128 |
| 2014/0285743 A1* | 9/2014 | Yu | ..................... | G02F 1/133707 349/43 |

FOREIGN PATENT DOCUMENTS

JP     2008-064918 A     3/2008

* cited by examiner

*Primary Examiner* — Dung Nguyen
(74) *Attorney, Agent, or Firm* — Studebaker & Brackett PC

(57) ABSTRACT

Each pixel of a multiple view liquid crystal display in a normally black mode includes a counter electrode provided with a slit for generating a fringe electric field. An alignment film subjected to liquid crystal alignment processing in a predetermined direction is disposed on a surface of a TFT substrate provided with the counter electrode. An angle formed by an extending direction of a slit at an end of a pixel region (a first region) and a direction of the liquid crystal alignment processing is greater than an angle formed by the extending direction of the slit in a central part of the pixel region (a second region) and the direction of the liquid crystal alignment processing. The first region has a higher transmittance than that in the second region when low luminance display is carried out.

10 Claims, 16 Drawing Sheets

F I G . 2
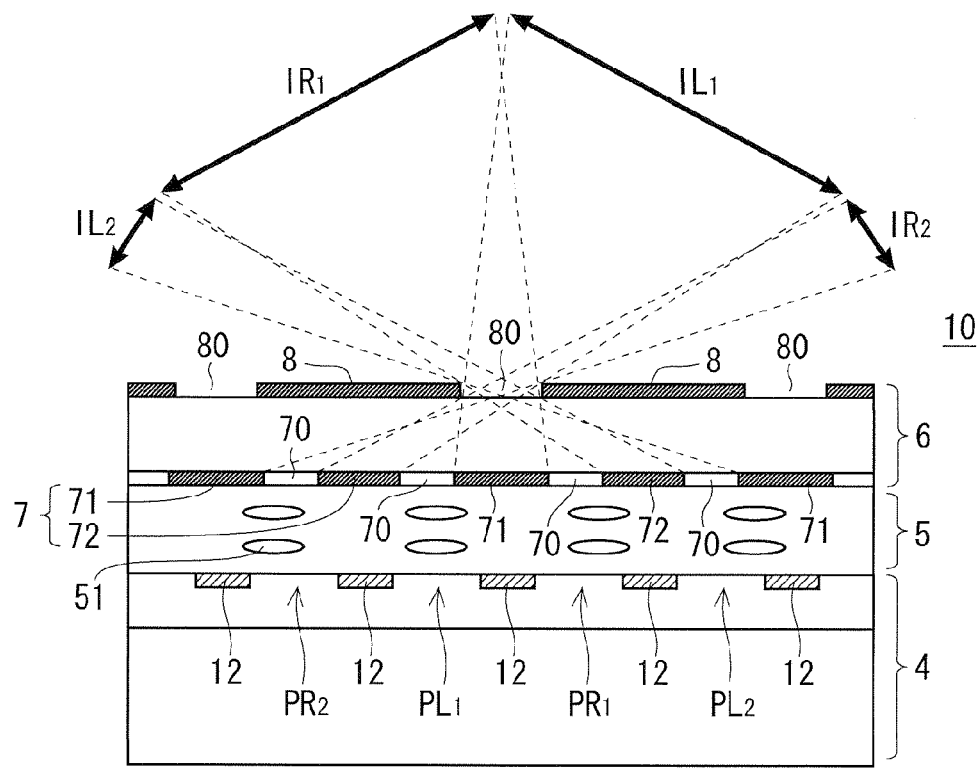
F I G . 3
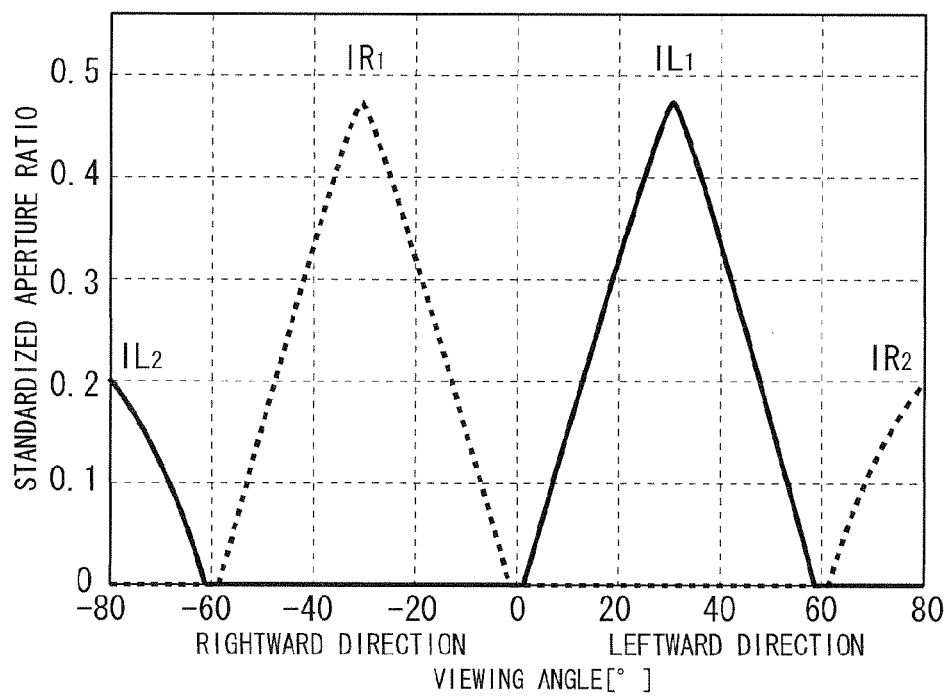

F I G . 4
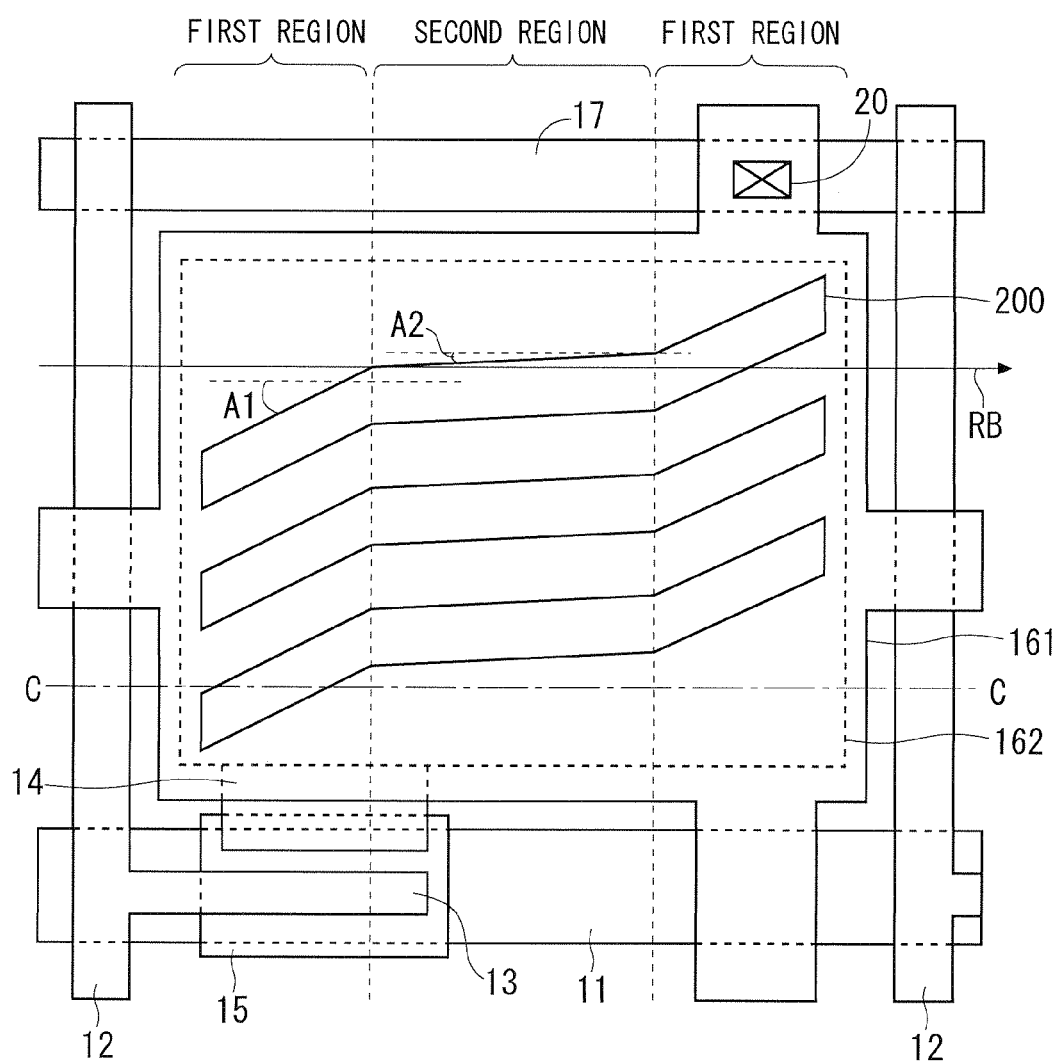

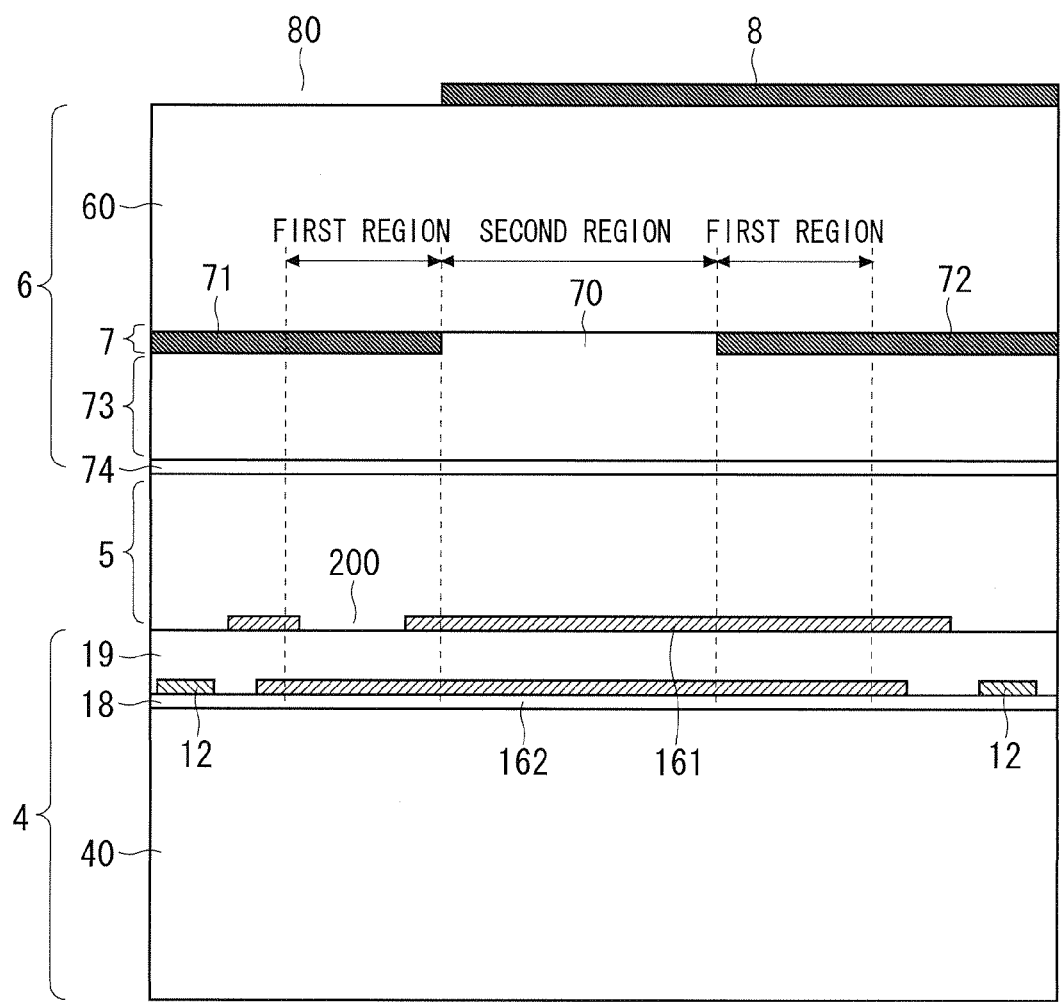
F I G . 5

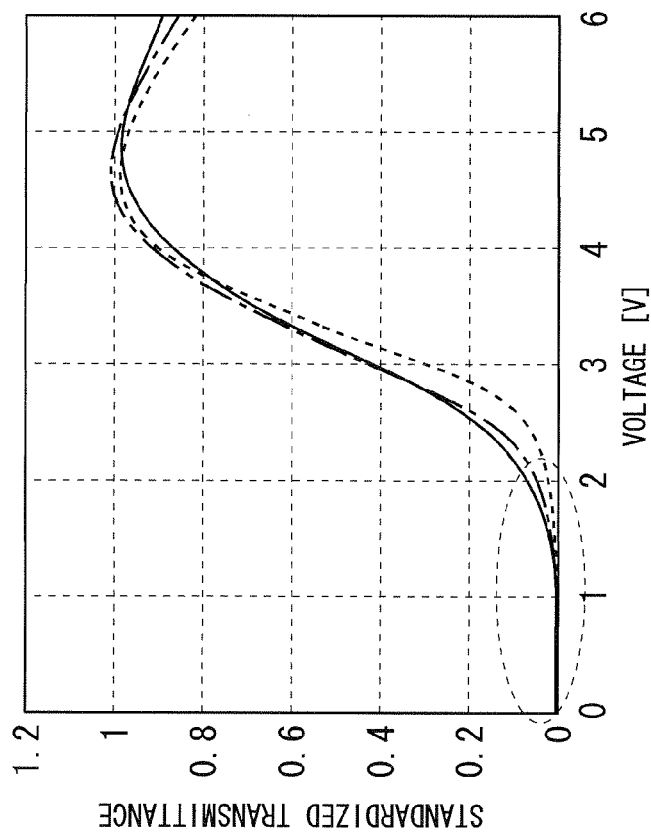

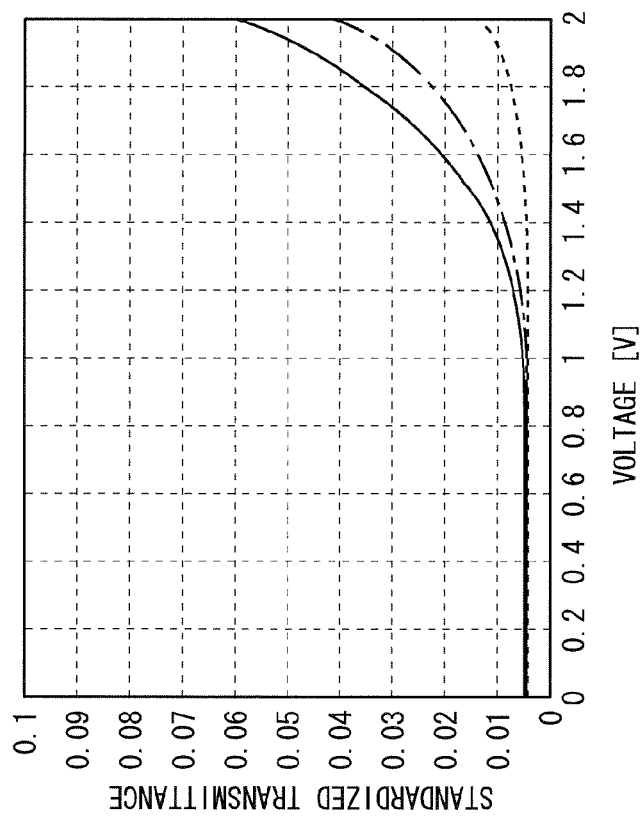

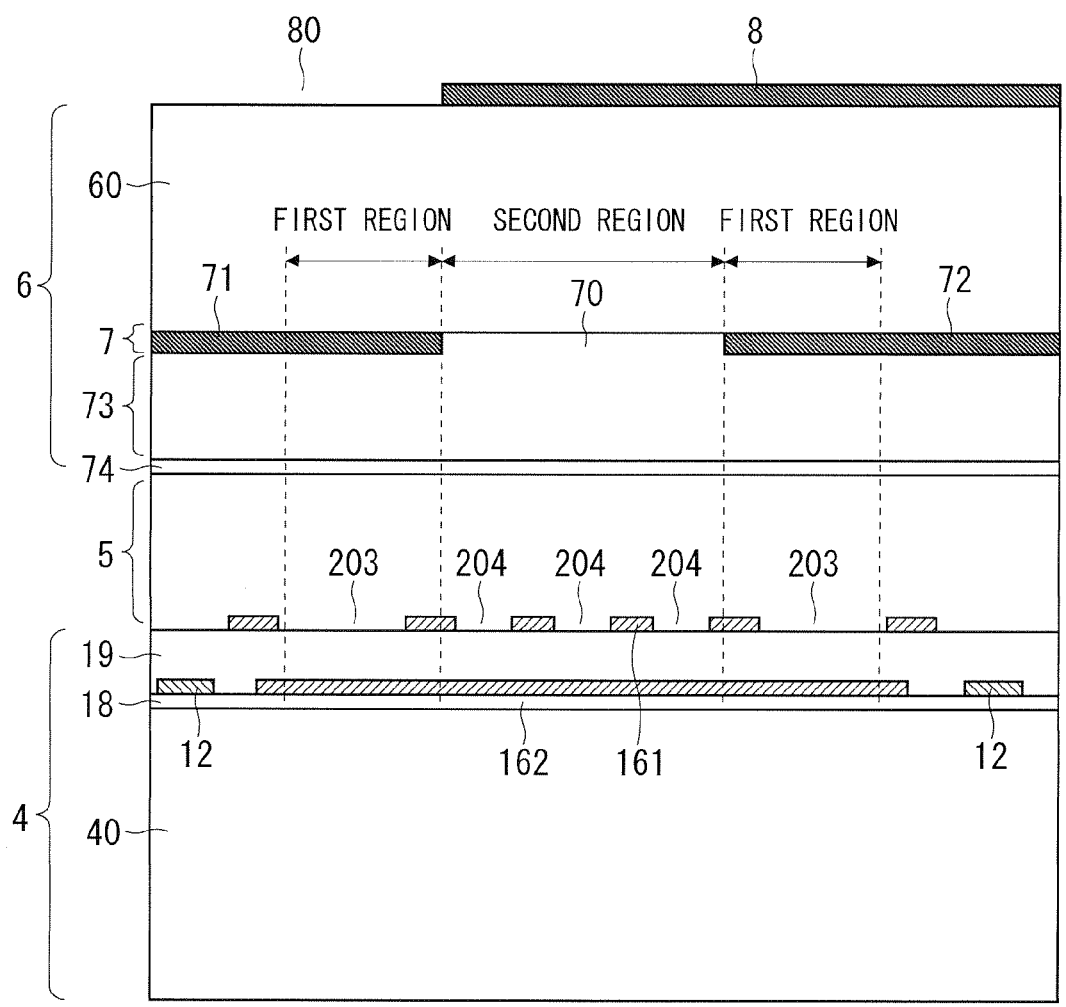

MULTIPLE VIEW LIQUID CRYSTAL DISPLAY

BACKGROUND OF THE INVENTION

Field of the Invention

The present invention relates to a liquid crystal display and more particularly to a multiple view liquid crystal display capable of displaying a plurality of images in different directions from each other.

Description of the Background Art

A multiple view liquid crystal display (a plural screen liquid crystal display) using a parallax barrier is developed as one of value added technologies of a liquid crystal display. In particular, there is often proposed a two-screen liquid crystal display for separating and displaying two different screens at the same time.

A multiple view liquid crystal display of a parallax barrier type has a structure including a liquid crystal display panel (hereinafter referred to as a "liquid crystal panel") in which pixels for displaying images are mixed and arranged in accordance with a predetermined rule, and a light shielding layer which is provided on a front side (a visual recognition side) and is referred to as a parallax barrier. The parallax barrier is disposed to shield light emitted from each pixel of the liquid crystal panel in a specific direction. Consequently, the light emitted from the liquid crystal panel is separated in a plurality of directions, and a plurality of images displayed by the liquid crystal panel is displayed in different directions from each other.

The multiple view liquid crystal display of the parallax barrier type has a problem of a crosstalk in which a part of images to be displayed in a certain direction are observed with leakage in images displayed in the other direction.

For example, in the case in which the crosstalk occurs in the two-screen liquid crystal display of the parallax barrier type for transversely dividing and displaying two images, the image (the left image) to be displayed as viewed from the left side to the screen and the image (the right image) to be displayed as viewed from the right side thereto are seen with overlapping. The crosstalk occurs when ranges of viewing angles (visual field ranges) of the respective images overlap with each other. For this reason, the crosstalk tends to occur in the vicinity of a boundary between the visual field ranges of the respective images. In other words, in the two-screen liquid crystal display, the crosstalk tends to occur as viewed from the front of the screen, that is, a boundary between the visual field range of the right image and the visual field range of the left image. When an image having much black display (low luminance display) is displayed, particularly, leakage from the other image is easily recognized visually even though it is very small. Therefore, image quality is greatly influenced.

In general, the liquid crystal panel has a structure including a first substrate provided with a pixel electrode and a switching element, a signal line or the like for supplying a pixel signal thereto, a second substrate provided with a black matrix for defining each pixel region and a color filter (CF), and a liquid crystal interposed therebetween. In the multiple view liquid crystal display of the parallax barrier type, the black matrix for defining the pixel region is formed on an opposed surface to the first substrate in the second substrate, and the parallax barrier is formed on an opposite surface (on the visual recognition side). Consequently, a gap corresponding to a thickness of the second substrate is present between the parallax barrier and the black matrix. A size of the gap is an element for determining a direction and an area of the visual field range of each of the images to be simultaneously displayed together with a size of an opening portion of the parallax barrier, a pitch of a pixel or the like.

In the multiple view liquid crystal display of the parallax barrier type, a phenomenon referred to as "reverse viewing" is caused by the presence of the gap between the parallax barrier and the black matrix. In the reverse viewing, an image to be displayed in a reverse direction is seen when the screen is seen in a direction deviating largely from the front of the screen. For example, when an observer moves rightward from the front of the screen with respect to the two-screen liquid crystal display, the right image is first seen. When the observer further continues to move rightward, a left image is seen within some range. This range is generated because another pixel is seen adjacently to a pixel to be originally seen through the opening portion of the parallax barrier.

In other words, in the two-screen liquid crystal display of the parallax barrier type, the visual field range for the left image due to the reverse viewing phenomenon is present on an outside of the visual field range for the right image, and the visual field range for the right image due to the reverse viewing phenomenon is present on the outside of the visual field range for the left image. For this reason, the crosstalk of the right image and the left image tends to occur in the vicinity of outer ends of the respective visual field ranges for the right image and the left image in addition to the vicinity of the front of the screen. A crosstalk occurring in the vicinity of the front of the screen will be referred to as a "front crosstalk" and a crosstalk caused by the reverse viewing phenomenon occurring in the vicinity of the outer end of the visual field range for each of the images will be referred to as a "reverse viewing crosstalk".

The front crosstalk and the reverse viewing crosstalk also become a problem in an optional multiple view liquid crystal display of a parallax barrier type in addition to the two-screen liquid crystal display.

In recent years, in a general liquid crystal display, there is expanded application of an In Plane Switching mode (including an FFS (Fringe Field Switching) mode and referred to as a "horizontal electric field mode") which is a method of mainly applying an electric field in a horizontal direction with respect to a substrate surface to drive a liquid crystal in place of a TN (Twisted Nematic) mode in the related art. A liquid crystal display in the horizontal electric field mode has a wide visual field range. By application to a multiple view liquid crystal display assuming observation in different directions, therefore, it is possible to expect considerable enhancement in display grade of the multiple view liquid crystal display. A structure of the multiple view liquid crystal display applying the horizontal electric field mode is disclosed in the following Japanese Patent Application Laid-Open No. 2008-064918, for example.

A crosstalk rate $R_{xt}$ indicative of an intensity of a crosstalk occurring in a two-screen liquid crystal display can be expressed as follows:

$$R_{xt} = (L_{wb} - L_{bb}) / \text{MIN}(L_{wb}, L_{bb}) \qquad \text{Equation (1)}$$

In the equation (1), $L_{wb}$ represents a luminance (a black luminance) on an observation side when black display is carried out on the observation side and white display is carried out on the other side (which will be hereinafter referred to as a "black luminance in white-black display"), and $L_{bb}$ represents a luminance (a black luminance) on the observation side when the black display is carried out on the observation side and the other side (which will be hereinafter referred to as a "black luminance in black-black display"). "MIN($L_{wb}$,$L_{bb}$)" is a function taking a smaller one of values of $L_{wb}$ and $L_{bb}$.

The equation (1) indicates a rate of light leaking from the other side carrying out the white display toward a visual field range on the observation side carrying out the black display. In order to decrease the crosstalk rate, two types of methods, that is, reduction in the black luminance $L_{wb}$ in the white-black display and increase in the black luminance $L_{bb}$ in the black-black display are effective. The method of reducing the black luminance $L_{wb}$ in the white-black display serves to suppress light leakage from the white display side, thereby decreasing the crosstalk itself. On the other hand, the method of increasing the black luminance $L_{bb}$ in the black-black display serves to increase the light leakage in the black display, thereby making the crosstalk unremarkable (reducing visibility).

A relationship between the crosstalk and the liquid crystal display mode will be considered. The TN mode in the related art is a normally white (NW) mode, while the horizontal electric field mode is a normally black (NB) mode. For this reason, the horizontal electric field mode has a higher contrast ratio (CR) than the TN mode, that is, has a lower black luminance.

The present inventor found a new problem. More specifically, if a liquid crystal panel in the horizontal electric field mode is used to constitute the multiple view liquid crystal display of the parallax barrier type, the crosstalk is deteriorated more greatly due to a low black luminance based on a high contrast ratio as compared with the case in which the TN mode is used. If the black luminance is increased in order to suppress the crosstalk, however, it is impossible to make the best of an advantage of the horizontal electric field mode, that is, a high contrast ratio. This problem is also caused in the multiple view liquid crystal display using the horizontal electric field mode disclosed in the Japanese Patent Application Laid-Open No. 2008-064918.

SUMMARY OF THE INVENTION

It is an object of the present invention to suppress occurrence of a crosstalk without reducing a contrast ratio within a visual field range on a practical use basis in a multiple view liquid crystal display in a normally black mode.

A multiple view liquid crystal display according to the present invention includes a liquid crystal panel in a normally black mode and a parallax barrier provided on a front surface of the liquid crystal panel. Each pixel of the liquid crystal panel includes a first region and a second region which have different voltage-transmittance characteristics from each other. The first region includes an end of the pixel. The second region includes a central part of the pixel. The first region has a voltage-transmittance characteristic with a higher transmittance than that in the second region when low luminance display is carried out.

According to the present invention, it is possible to reduce a crosstalk rate without decreasing a contrast ratio within a visual field range on a practical use basis.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a sectional view showing a liquid crystal display panel of a parallax barrier type;

FIG. 3 is a graph showing a simulation result of a viewing angle characteristic of a standardized aperture ratio in a two-screen liquid crystal display;

FIG. 4 is a plan view showing a structure of a pixel in a multiple view liquid crystal display according to a first preferred embodiment;

FIG. 5 is a sectional view showing the structure of the pixel in the multiple view liquid crystal display according to the first preferred embodiment;

FIGS. 6A and 6B are graphs each showing an influence of an angle formed by an extending direction of a slit and a rubbing direction in a counter electrode in a liquid crystal panel in an FFS mode on a transmittance-voltage characteristic of a liquid crystal layer;

FIG. 10 is a sectional view showing the structure of the pixel in the multiple view liquid crystal display according to the third preferred embodiment;

DESCRIPTION OF THE PREFERRED EMBODIMENTS

<First Preferred Embodiment>

Figure 1:
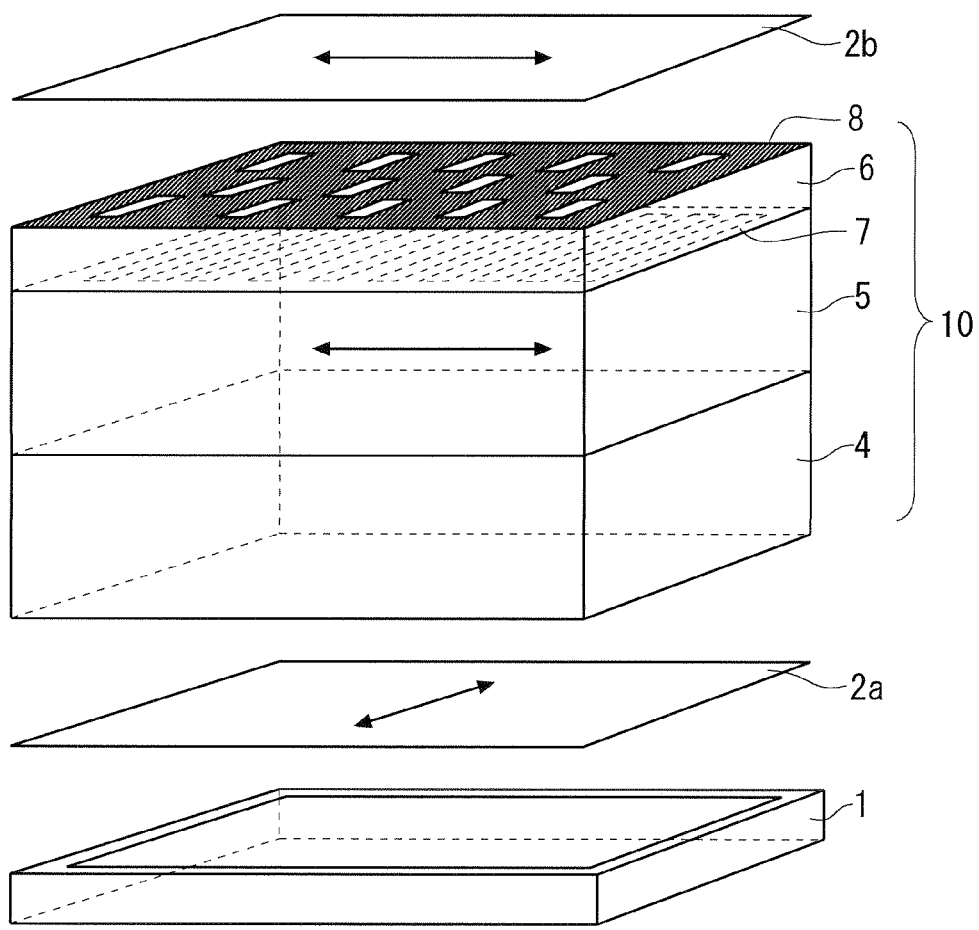
FIG. 1 is an exploded perspective view showing a structure of a multiple view liquid crystal display according to the present invention.

FIG. 1 is an exploded perspective view showing a schematic structure of a multiple view liquid crystal display device according to the present invention. As shown in FIG. 1, the multiple view liquid crystal display is a transmission type display device in which a linear polarizer 2a, a liquid crystal panel 10 and a linear polarizer 2b are superposed in order on a backlight 1 to be a surface light source device including a light source, a light guide plate and the like. The liquid crystal panel 10 has a structure in which a liquid crystal 5 is interposed between a TFT (Thin Film Transistor) substrate 4 on the backlight 1 side and a counter substrate 6 on a front side (a visual recognition side).

The counter substrate 6 includes a black matrix 7 on an opposed surface to the TFT substrate 4, and includes a parallax barrier 8 on a surface at the visual recognition side of the counter substrate 6. In other words, in the present preferred embodiment, the counter substrate 6 provided between the parallax barrier 8 and the black matrix 7 (more accurately, a translucent substrate constituting the counter substrate 6) functions as a gap layer for defining an interval between the parallax barrier 8 and the black matrix 7. Although an example in which the counter substrate 6 serves as the gap layer is described in each preferred embodiment, the gap layer may be provided separately from the counter substrate 6. For example, the parallax barrier layer, the black matrix and the gap layer therebetween (a resin layer formed by coating in a predetermined thickness or the like) may be provided at an inside of the counter substrate 6 (for instance, an opposed surface to the TFT substrate 4 in the counter substrate 6).

In the liquid crystal panel 10, the TFT substrate 4 and the counter substrate 6 are stuck together through a sealing material applied to a peripheral edge part thereof, and the liquid crystal 5 is sealed in a region surrounded by the sealing material.

Herein, there is shown an example in which the present invention is applied to the liquid crystal panel 10 in an FFS mode. In other words, in the liquid crystal panel 10, the TFT substrate 4 has both of a pixel electrode and a counter electrode, and a slit (an opening portion) is provided on one of the electrodes.

The TFT substrate 4 has a translucent substrate such as a glass substrate on which there are provided a pixel electrode of each pixel, a TFT to be a switching element for supplying a pixel signal to the pixel electrodes, a gate wiring (a scanning signal wiring) for supplying a driving signal to a gate electrode of the TFT, a source wiring (a display signal wiring) for supplying an image signal to a source electrode of the TFT, a counter electrode disposed opposite to each pixel electrode, and the like, and furthermore, includes an alignment film on an outermost surface at the liquid crystal 5 side.

The counter substrate 6 is formed by providing an overcoat layer constituted by a transparent resin film, a color filter constituted by a colored layer having each of red (R), green (G) and blue (B) colors, a black matrix 7 to be a light shielding film for defining a region of each pixel by shielding light between pixels and the like on a surface at the liquid crystal 5 side in the translucent substrate such as the glass substrate. Moreover, the parallax barrier 8 is provided on the surface at the visual recognition side of the counter electrode 6. Accordingly, the gap between the black matrix 7 and the parallax barrier 8 corresponds to a thickness of the counter substrate 6 (a thickness of the translucent substrate).

The linear polarizers 2a and 2b are films for selectively transmitting specific linearly polarized light (P polarized light or S polarized light). In the present preferred embodiment, the linear polarizers 2a and 2b to be used are of an absorption type for absorbing the linearly polarized light of a polarization axis (an absorption axis) which is orthogonal to the linear polarized light to be transmitted with a TAC (cellulose triacetate) film used as a substrate. The linear polarizers 2a and 2b to be used may be of a reflection type for reflecting the linearly polarized light of the polarization axis which is orthogonal to the linearly polarized light to be transmitted.

In the present preferred embodiment, a two-screen liquid crystal display is shown as an example of the multiple view liquid crystal display. The two-screen liquid crystal display serves to display two different images by dividing them into right and left side images from the front of the display. However, the present invention can be widely applied to a multiple view liquid crystal display of a parallax barrier type which displays at least two images in different directions.

FIG. 2 is a sectional view showing the structure of the liquid crystal panel 10 to be used in the two-screen liquid crystal display. A pixel PR (a right pixel) constituting an image (a right image) to be displayed toward a visual field range from a right side to the front of the screen and a pixel PL (a left pixel) constituting an image (a left image) to be displayed toward a visual field range from a left side to the front of the screen are mixed and provided in accordance with a predetermined rule in the liquid crystal panel 10 of the two-screen liquid crystal display. The parallax barrier 8 separates light of the right pixel PR and light of the left pixel PL into the right and left sides to the front of the screen respectively, thereby separating the right image and the left image and displaying them in different directions respectively.

The parallax barrier 8 is a light shielding film for shielding the light of the left pixel PL with respect to the right side from the front of the screen and shielding the light of the right pixel PR with respect to the left side from the front of the screen. In other words, the parallax barrier 8 is a light shielding film having an opening portion 80 for transmitting only the light of the right pixel PR rightward from the front of the screen and transmitting only the light of the left pixel PL leftward from the front of the screen.

A pattern of the parallax barrier 8 is determined depending on an array pattern of the right pixel PR and the left pixel PL in the liquid crystal panel 10. If the parallax barrier 8 is designed to accurately enable display of a right side image rightward from the front of the screen and a left side image leftward from the front of the screen respectively, the pattern may be optional. For example, the opening portion 80 may be disposed on the parallax barrier 8 like a checker pattern (in zigzag) or the opening portion 80 is disposed on the parallax barrier 8 like a stripe.

With reference to FIG. 2, description will be given to the principle for separating two images in the two-screen liquid crystal display. As described above, the liquid crystal panel 10 has the structure in which the liquid crystal 5 is interposed between the TFT substrate 4 on a back side (the backlight 1 side) and the counter substrate 6 on the front side (the visual recognition side) (FIG. 2 schematically shows a liquid crystal molecule 51 in the liquid crystal 5). The TFT substrate 4 is provided with a pixel electrode of each pixel, a counter electrode, a TFT, a gate wiring, a source wiring and the like. In FIG. 2, only a source wiring 12 is shown.

The black matrix 7 is formed on the opposed surface to the TFT substrate 4 in the counter substrate 6, and the parallax barrier 8 is formed on the surface at the visual recognition side. Although a color filter or the like is actually formed in addition to the black matrix 7 on the opposed surface to the TFT substrate 4 in the counter substrate 6, they are not shown in FIG. 2.

The black matrix 7 is a light shielding film including an opening portion (a pixel opening portion) 70 for defining a region of each pixel. Herein, it is assumed that the left pixel PL and the right pixel PR are alternatively disposed every pixel string. In other words, the pixel string of the right pixel PR and that of the left pixel PL are alternately disposed like a stripe in plan view.

The pixel opening portion 70 is provided in a shifted position from the opening portion 80 of the parallax barrier 8. In other words, a light shielding portion 71 of the black matrix 7 is provided just under the opening portion 80 of the parallax barrier 8. The right pixel PR and the left pixel PL which are to be visually recognized from the same opening portion 80 of the parallax barrier 8 are provided to interpose the light shielding portion 71 therebetween. Moreover, a light shielding portion 72 of the black matrix 7 is disposed between the right pixel PR and the left pixel PL which are adjacent to each other also in a region covered with the light shielding portion of the parallax barrier 8. The light shielding portion 71 provided just under the opening portion 80 of the parallax barrier 8 will be referred to as a "first light shielding portion" and the second light shielding portion 72 having an uppermost part covered with the parallax barrier 8 will be referred to as a "second light shielding portion".

In the present preferred embodiment, the pixel string of the right pixel PR and the pixel string of the left pixel PL are alternately disposed like a stripe. For this reason, the pixel opening portions 70 are disposed on the black matrix 7 like a stripe. At this time, the light shielding portion of the black matrix 7 has a pattern in which the first light shielding portion 71 and the second light shielding portion 72 are alternately disposed with the pixel opening portion 70 interposed therebetween as shown in FIG. 2.

The opening portion 80 of the parallax barrier 8 and the pixel opening portion 70 of the black matrix 7 have the positional relationship described above. Consequently, the right image generated by the right pixel PR is displayed rightward from the front of the screen and the left image generated by the left pixel PL is displayed leftward from the front of the screen. With reference to FIG. 2, the right image generated by the right pixel PR can be recognized visually from a visual field range $IR_1$ and the left image generated by the left pixel PL can be recognized visually from a visual field range $IL_1$.

In a position in which the visual field range $IR_1$ of the right image and the visual field range $IL_1$ of the left image overlap with each other, a crosstalk occurs. For this reason, the gap between the black matrix 7 and the parallax barrier 8 and the positions or diameters of the pixel opening portion 70 and the opening portion 80 of the parallax barrier 8 are designed in such a manner that they do not overlap with each other as much as possible in the liquid crystal panel 10.

In the multiple view liquid crystal display according to the present preferred embodiment, the gap between the black matrix 7 and the parallax barrier 8 and the respective positions and diameters of the pixel opening portion 70 of the black matrix 7 and the opening portion 80 of the parallax barrier 8 are designed in such a manner that the visual field range IR of the right image and the visual field range IL of the left image are separated from each other.

A whole thickness of the counter substrate 6 is determined depending on a condition of a viewing angle and a pixel size which are required for the display device. For example, when the pixel size is 200 μm and the condition for each of view angle ranges from the front of the screen to the right and left is up to 60 degrees, a maximum thickness of the counter substrate 6 which is permitted is approximately 0.09 mm.

FIG. 3 is a graph showing a simulation result of a viewing angle characteristic of a standardized aperture ratio in a multiple view liquid crystal display designed based on the condition. Referring to the standardized aperture ratio, the case in which a total width of a pixel can be utilized as a light transmitting portion is set to be "1". A graph shown in a dotted line indicates a standardized aperture ratio for a right image and a graph shown in a solid line indicates a standardized aperture ratio for a left image.

The standardized aperture ratio of the right image has a peak in the vicinity of a position of 30 degrees rightward from the front and the standardized aperture ratio of the left image has a peak in the vicinity of a position of 30 degrees leftward from the front of the screen. Moreover, the vicinity of the front surface (0°) is a region in which the standardized aperture ratios of both of the right image and the left image are zero, that is, neither the right image nor the left image can be seen. This implies that the visual field range $IR_1$ of the right image and the visual field range $IL_1$ of the left image are separated from each other and a front crosstalk does not occur according to calculations.

However, the front crosstalk actually occurs in the vicinity of the front of the screen (0°) due to a light diffraction phenomenon in the opening portion of the parallax barrier 8, a light scattering phenomenon in the liquid crystal panel 10 or the like.

The crosstalk is the most remarkable within a visual field range to which an end of the opening portion 80 of the parallax barrier 8 contributes, that is, a visual field range in which an image is switched. For example, the front crosstalk is the most remarkable within a visual field range in the vicinity of the front of the screen in which the right image and the left image are switched (in the vicinity of a boundary between the visual field range $IR_1$ of the right image and the visual field range $IL_1$ of the left image).

Among light emitted from each pixel, only light emitted from an end of the pixel opening portion 70 of the black matrix 7 and transmitted through the end of the opening portion 80 of the parallax barrier 8 contributes to display in the vicinity of the front surface of the screen, and light emitted from a central part of the pixel opening portion 70 does not contribute. With reference to FIG. 2, for example, only light emitted from a left end of the right pixel $PR_1$ is transmitted from the right pixel $PR_1$ toward the vicinity of the front surface of the screen. Similarly, only light emitted from a right end of the left pixel $PL_1$ is transmitted from the left pixel $PL_1$ toward the vicinity of the front surface of the screen. Thus, only light emitted from an end of each pixel (an end on a close side to the opening portion 80 of the parallax barrier 8) contributes to the front crosstalk.

A reverse viewing crosstalk is also the same. In other words, the reverse viewing crosstalk is the most remarkable within a visual field range in the vicinity of a boundary between the visual field range $IR_1$ of the right image and the visual field range $IL_2$ of the left image on an outside thereof, and a visual field range in the vicinity of a boundary between the visual field range $IL_1$ of the left image and the visual field range $IR_2$ of the right image on the outside.

Among light emitted from each pixel, only light emitted from the end of the pixel opening portion 70 of the black matrix 7 and transmitted through the end of the opening portion 80 of the parallax barrier 8 contributes to display in their visual field ranges, and light emitted from the central part of the pixel opening portion 70 does not contribute. With reference to FIG. 2, for example, only light emitted from the right end of the right pixel $PR_1$ is transmitted from the right pixel $PR_1$ toward the vicinity of the boundary between the visual field range $IR_1$ and the visual field range $IL_2$. Similarly, only light emitted from the left end of the left pixel $PL_1$ is transmitted from the left pixel $PL_1$ toward the vicinity of the boundary between the visual field range $IL_1$ and the visual field range $IR_2$. Thus, only light emitted from an end of each pixel (an end on a distant side from the opening portion 80 of the parallax barrier 8) contributes to the reverse viewing crosstalk.

FIGS. 4 and 5 are views showing the structure of the pixel in the multiple view liquid crystal display according to the first preferred embodiment. FIG. 4 is a plan view showing the pixel and FIG. 5 is a sectional view taken along a C-C line illustrated in FIG. 4. In FIG. 4, the liquid crystal 5 and the counter substrate 6 are not shown. For this reason, a planar structure of a pixel portion in the TFT substrate 4 is shown. On the other hand, FIG. 5 shows the liquid crystal 5 and the counter substrate 6 in addition to the TFT substrate 4.

The TFT substrate 4 is provided with gate wirings 11 which are parallel with each other and source wirings 12 which are parallel with each other. The gate wirings 11 and the source wirings 12 cross each other in plan view, and a pixel region is disposed corresponding to an individual region surrounded by the gate wiring 11 and the source wiring 12.

The gate wiring 11 is formed on a translucent substrate 40 constituting the TFT substrate 4, and an upper part thereof is covered with a gate insulation film 18. A semiconductor thin film 15 serving as a channel layer of the TFT is formed on the gate insulation film 18 so as to overlap with the gate wiring 11, and a source electrode 13 and a drain electrode 14 of the TFT are formed thereon. An overlapping portion with the semiconductor thin film 15 in the gate wiring 11 functions as a gate electrode of the TFT. Moreover, the source electrode 13 is connected to the source wiring 12.

Furthermore, a pixel electrode 162 constituted by a transparent conductive film is formed in almost the whole pixel region. A part of the pixel electrode 162 is provided over the drain electrode 14 so that both of them are electrically connected to each other.

A counter electrode 161 constituted by a transparent conductive film having a plurality of slits 200 is formed above the pixel electrode 162 through an interlayer insulation film 19. A predetermined electric potential (a common potential) is supplied from a common wiring 17 to the counter electrode 161. The common wiring 17 and the gate wiring 11 are provided on the same layer, and the counter electrode 161 is connected to the common wiring 17 through a contact hole 20.

An alignment film subjected to rubbing processing is formed on an outermost surface at the liquid crystal 5 side in the TFT substrate 4, which is not shown. An arrow RB shown in FIG. 4 indicates a rubbing direction of the alignment film.

On the other hand, the counter substrate 6 includes the black matrix 7 formed on the opposed surface to the TFT substrate 4 in a translucent substrate 60 and the parallax barrier 8 formed on an opposite surface thereto (the visual recognition side). Accordingly, the gap between the black matrix 7 and the parallax barrier 8 is defined by a thickness of the translucent substrate 60. Moreover, a colored layer 73 having each of red, green and blue colors and an overcoat layer 74 for covering the colored layer 73 are further formed on the opposed surface to the TFT substrate 4 in the translucent substrate 60.

The multiple view liquid crystal display according to the first preferred embodiment includes regions in which the slits 200 of the counter electrode 161 are designed differently from each other in the respective pixel regions. In other words, a first region in which an angle formed by an extending direction (a direction along a long side (a longitudinal direction)) of the slit 200 and the rubbing direction RB is represented by A1 and a second region in which an angle formed by the extending direction of the slit 200 and the rubbing direction RB is represented by A2 are provided in each of the pixel regions. The first region is disposed on the left and right ends of the pixel region and the second region is disposed in the central part of the pixel region. As shown in FIG. 5, "the end of the pixel region" in which the first region is disposed is mainly covered with the black matrix 7 (the first light shielding portion 71 or the second light shielding portion 72).

As shown in FIG. 4, the angle A1 formed by the extending direction of the slit 200 and the rubbing direction RB in the first region is set to be greater than the angle A2 formed by the extending direction of the slit 200 and the rubbing direction RB in the second region (that is, A1>A2). In the present preferred embodiment, the rubbing directions RB are set to be identical to each other in the first region and the second region, and the extending directions of the slits 200 are set to be different from each other in the first region and the second region. Thus, the relationship is obtained. Moreover, each slit 200 takes a shape of a polygonal line which is continuous from the vicinity of a right end to the vicinity of a left end in the counter electrode 161 and is bent on the boundary between the first region and the second region.

Herein, a separating direction of an image in the multiple view liquid crystal display is assumed to be a horizontal direction. For example, in the case in which the separating direction of the image is equivalent to a vertical direction, the first region is disposed on upper and lower ends of the pixel region and the second region is disposed therebetween. In other words, the first region is disposed on the end in the separating direction of the image in the pixel region.

FIGS. 6A and 6B are graphs each showing an influence of an angle formed by an extending direction of a slit and a rubbing direction in a counter electrode on a relationship between a driving voltage of a liquid crystal and a transmittance of the liquid crystal (a transmittance-voltage characteristic) in a liquid crystal panel in an FFS mode. A graph of FIG. 6B is obtained by enlarging a portion shown in an elliptical dotted line (a range in which a driving voltage is 0V to 2V) in the graph of FIG. 6A. FIGS. 6A and 6B show respective graphs in the case in which the angle formed by the extending direction of the slit and the rubbing direction in the counter electrode is 5 degrees, the case in which the angle is 10 degrees and the case in which the angle is 15 degrees. A standardized transmittance taken as ordinate axes in the graphs of FIGS. 6A and 6B indicates a transmittance in which "1" represents the case in which all incident light is transmitted light.

The liquid crystal panel in the FFS mode has a feature that an inclination of the transmittance-voltage characteristic is decreased if the angle formed by the extending direction of the slit and the rubbing direction in the counter electrode is increased. For this reason, within a range in which the driving voltage of the liquid crystal is low, the transmittance of the liquid crystal is increased with increase in the angle formed by the extending direction of the slit and the rubbing direction as shown in FIG. 6B. With the pixel having the slit 200 shown in FIG. 4, accordingly, the transmittance is higher at the end (the first region) in the pixel region having a large angle formed by the extending direction of the slit 200 and the rubbing direction than the central part having the small angle when the driving voltage of the liquid crystal is low.

The liquid crystal panel 10 according to the present preferred embodiment is set into a normally black mode. For this reason, black display (low luminance display) is carried out within a range in which the driving voltage of the liquid crystal is low. In other words, with the pixel of FIG. 4, the central part has a higher luminance at the end than that in the central part when the black display is carried out.

As described with reference to the equation (1), a method of decreasing a crosstalk in the multiple view liquid crystal display includes a method of increasing a black luminance ($L_{bb}$). However, there is a problem in that it is impossible to make the best of the feature of a horizontal electric field mode, that is, a contrast ratio is increased (a black luminance is reduced) when the black luminance is increased in the multiple view liquid crystal display in the horizontal electric field mode in the related art.

In the present preferred embodiment, it is noted that the crosstalk is easily recognized visually in the black display and only the light emitted from the end of the pixel contributes to the crosstalk, and the luminance on the end of each pixel (the first region) is made higher than that in the central part (the second region) in the black display. Consequently, the method of increasing the black luminance is carried out at the end of the pixel contributing to the crosstalk while the black luminance is maintained to be low in the central part of the pixel. In the multiple view liquid crystal display according to the present preferred embodiment, accordingly, it is possible to reduce the crosstalk while preventing the feature of the horizontal electric field mode, that is, a high contrast ratio, from being damaged.

It is preferable that the angle A1 formed by the extending direction of the slit 200 and the rubbing direction RB in the first region and the angle A2 formed by the extending direction of the slit 200 and the rubbing direction RB in the second region should be 0 degree<A1<15 degrees and 5 degrees<A2<30 degrees, respectively.

Description will be given to a method of manufacturing the TFT substrate 4 according to the present preferred embodiment.

First of all, a metal film is formed on the translucent substrate 40 such as a glass substrate by sputtering and is subjected to patterning by a photomechanical process and etching so that the gate wiring 11 and the common wiring 17 are formed. Then, the gate insulation film 18 is formed to cover the gate wiring 11 and the common wiring 17.

Subsequently, a semiconductor thin film including an intrinsic semiconductor layer (an i layer) to be a lower layer and an n-type semiconductor layer to be an upper layer are formed on the gate insulation film 18. Then, the semiconductor thin film is subjected to the patterning so that the semiconductor thin film 15 serving as the channel layer of the TFT is formed. Furthermore, a metal film is formed by the sputtering and is then subjected to the patterning so that the source wiring 12, the source electrode 13 and the drain electrode 14 are formed. In etching for the patterning, the whole n layer in the semiconductor thin film 15 portion exposed between the source wiring 12 and the source electrode 13 and a part of the i layer are removed (back channel etch). Consequently, the TFT is formed.

Then, an ITO to be a transparent conductive film is formed and is subjected to the patterning so that the pixel electrode 162 is formed. Furthermore, the interlayer insulation film 19 is formed so that the contact hole 20 reaching the common wiring 17 is formed on the interlayer insulation film 19. Thereafter, the ITO is formed by the sputtering again and is subjected to the patterning so that the counter electrode 161 having the slit 200 is formed. At this time, a part of the counter electrode 161 is connected to the common wiring 17 through the contact hole 20.

Through the steps, the TFT substrate 4 is completed.

In the present preferred embodiment, in the patterning step for the counter electrode 161, the extending direction of the slit 200 to be provided on the counter electrode 161 is made different at the end (the first region) and the central part (the second region) in the pixel. Consequently, the angle formed by the extending direction of the slit 200 in the counter electrode 161 and the direction (the rubbing direction RB) of the rubbing processing to be then executed can be different between the first region and the second region (so as to obtain A1>A2).

The alignment film for controlling the alignment of the liquid crystal 5 is provided on the respective surfaces (surfaces on the liquid crystal 5 side) of the completed TFT substrate 4 and the counter substrate 6 fabricated separately. The alignment film is formed by coating a material such as a polyimide resin and executing predetermined liquid crystal alignment processing over the surface. In the present preferred embodiment, a rubbing method of rubbing the surface of the alignment film in one direction (the rubbing direction RB) with a cloth provided on a surface of a rotary roller or the like is used as the liquid crystal alignment processing.

The liquid crystal alignment processing to be executed over the alignment film is not restricted to the rubbing method. For example, it is also possible to use an optical alignment method of carrying out liquid crystal alignment processing by irradiating the surface of the alignment film with light such as ultraviolet rays. Also in the case in which an optical alignment method is used, the direction of the liquid crystal alignment processing may be the same as that in the case in which the rubbing method is used (the same as the rubbing direction RB). Second to fifth preferred embodiments which will be described below are also carried out in the same manner.

<Second Preferred Embodiment>

Figure 7:
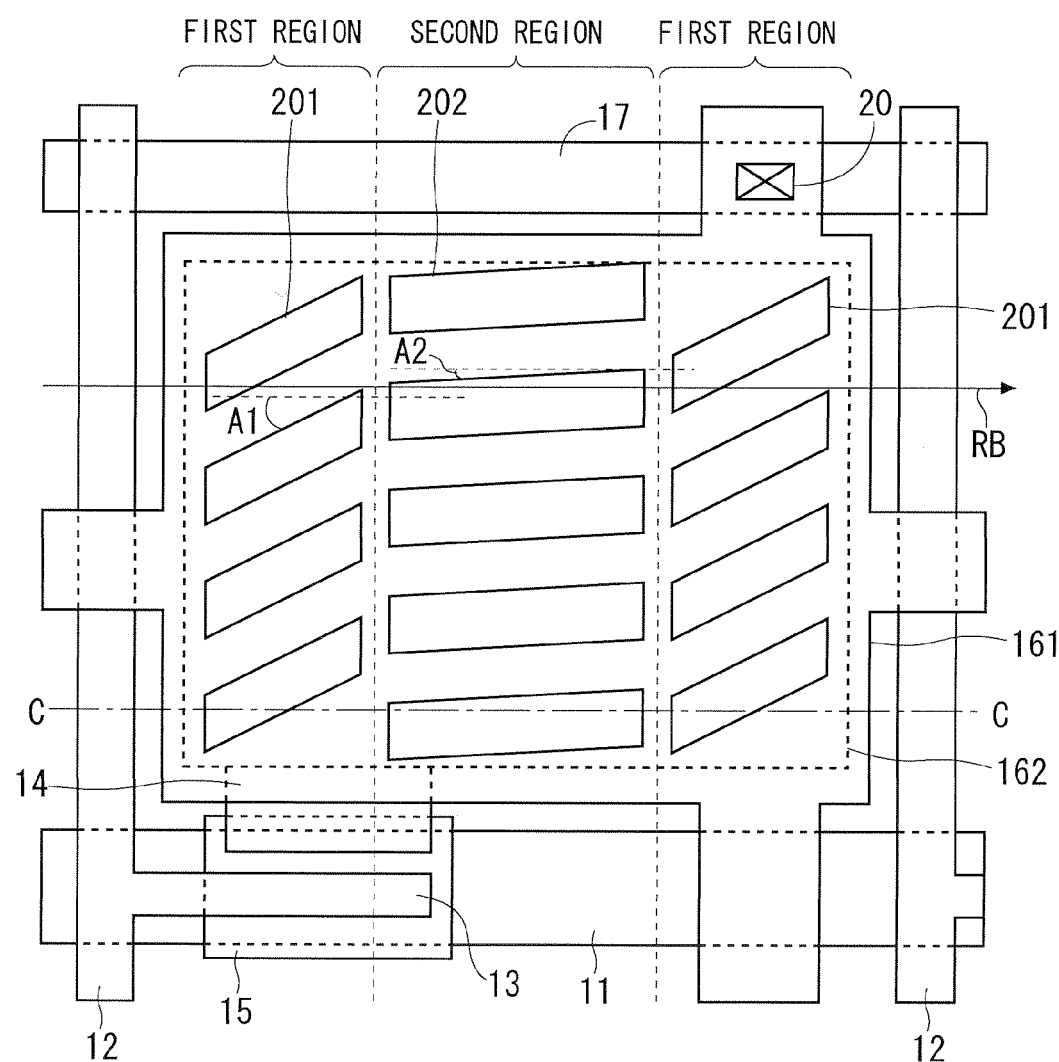
FIG. 7 is a plan view showing a structure of a pixel in a multiple view liquid crystal display according to a second preferred embodiment.
Figure 8:
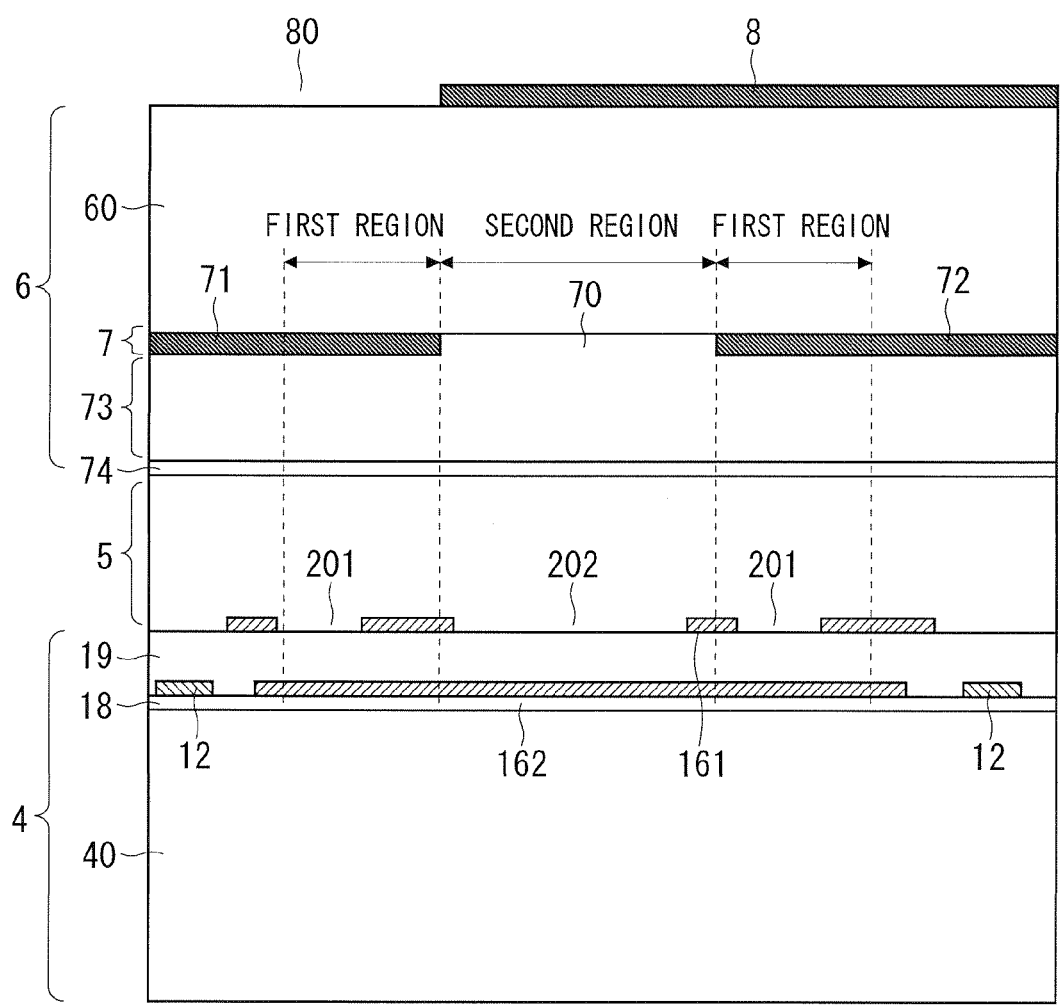
FIG. 8 is a sectional view showing the structure of the pixel in the multiple view liquid crystal display according to the second preferred embodiment.

FIGS. 7 and 8 are views showing a structure of a pixel in a multiple view liquid crystal display according to a second preferred embodiment. FIG. 7 is a plan view showing the pixel and FIG. 8 is a sectional view taken along a C-C line illustrated in FIG. 7. In FIG. 7, a liquid crystal 5 and a counter substrate 6 are not shown. For this reason, a planar structure of a pixel portion in a TFT substrate 4 is shown. On the other hand, FIG. 8 shows the liquid crystal 5 and the counter substrate 6 in addition to the TFT substrate 4.

As shown in FIG. 7, in the pixel of the multiple view liquid crystal display according to the second preferred embodiment, a slit to be provided on a counter electrode 161 is separated into a first region portion and a second region portion. In other words, a slit 201 and a slit 202 are independently provided on the counter electrode 161 respectively. The slit 201 is provided on an end of a pixel region (the first region) and the slit 202 is provided on a central part of the pixel region (the second region).

The other structures are the same as those in the first preferred embodiment. In other words, the slits 201 and 202 are laid out in such a manner that an angle A1 formed by an extending direction of the slit 201 in the first region and a rubbing direction RB is greater than an angle A2 formed by an extending direction of the slit 202 in the second region and the rubbing direction RB (A1>A2). More specifically, the rubbing direction RB is set to be identical in the first region and the second region, and the extending direction of the slit 201 and that of the slit 202 are set to be different from each other. Thus, the relationship of A1>A2 is obtained.

Also in the second preferred embodiment, it is possible to obtain the same effect as that in the first preferred embodiment. By individually disposing the slit in the first region and the second region, moreover, it is possible to generally lessen a region in which the slit cannot be disposed in a rectangle pixel region, thereby providing a slit 200 over the whole pixel region (in comparison between FIGS. 4 and 7, an area occupied by the slit of the counter electrode 161 is larger in FIG. 7). Consequently, a transmittance of the liquid crystal 5 in the first region can be brought into a more uniform state. In addition, it is also possible to obtain an effect for increasing a light utilization efficiency.

Furthermore, the counter electrode 16 has a grid-like pattern. Consequently, redundancy of the counter electrode 161 is increased. For example, even though a pattern defect is caused in formation of the counter electrode 161, a portion to which a common potential is not supplied is rarely generated in the counter electrode 161.

It is also possible to use the combination of the slits 201 and 202 according to the present preferred embodiment with the slit 200 according to the first preferred embodiment. For example, in FIG. 4, the slit 201 or 202 may be provided in a region in which the slit 200 cannot be disposed. Consequently, it is also possible to obtain the same effect as that in the second preferred embodiment.

Since a method of manufacturing the TFT substrate 4 according to the second preferred embodiment may be the same as that in the first preferred embodiment except for a difference in the pattern of the slit to be provided on the counter electrode 161, description will be omitted.

<Third Preferred Embodiment>

Figure 9:
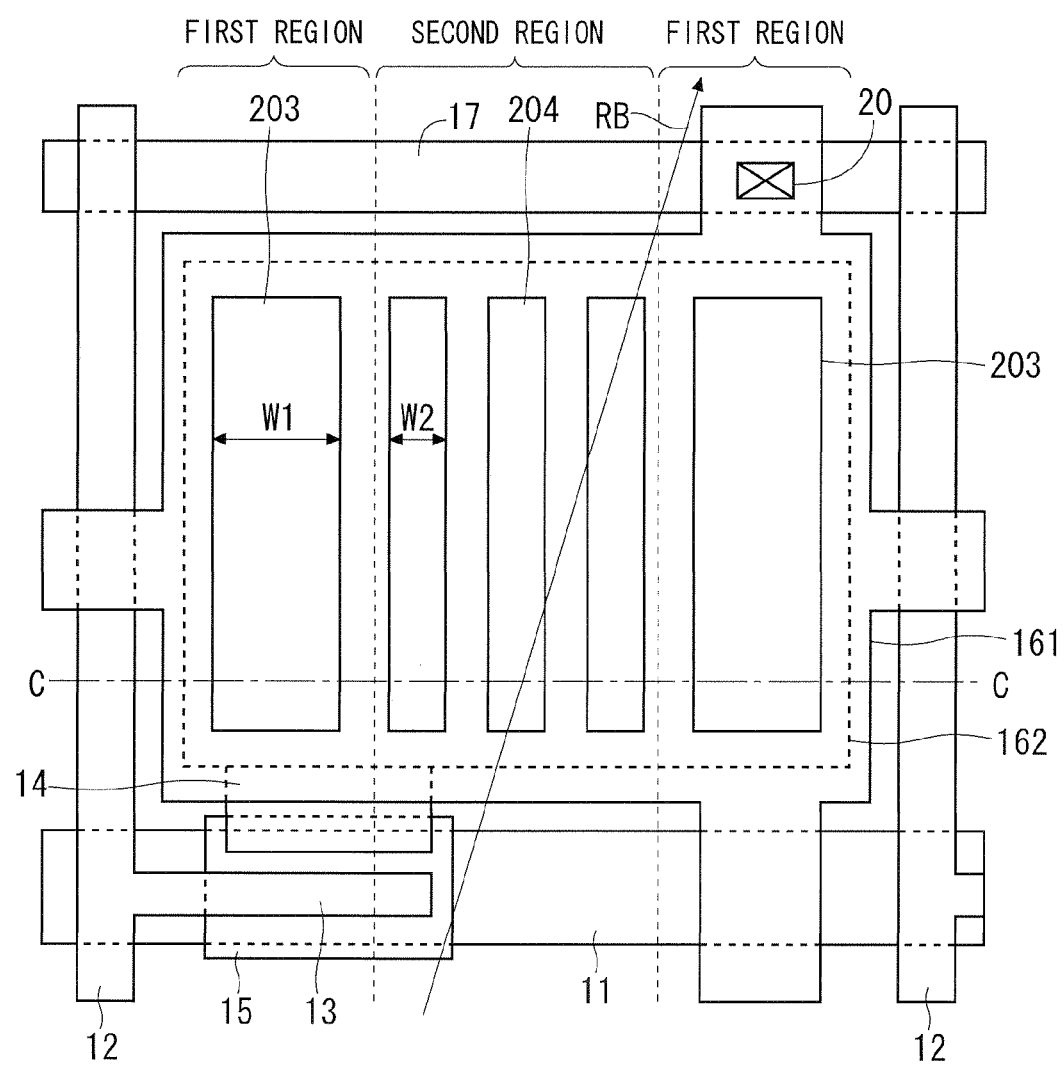
FIG. 9 is a plan view showing a structure of a pixel in a multiple view liquid crystal display according to a third preferred embodiment.

FIGS. 9 and 10 are views showing a structure of a pixel in a multiple view liquid crystal display according to a third preferred embodiment. FIG. 9 is a plan view showing the pixel and FIG. 10 is a sectional view taken along a C-C line illustrated in FIG. 9. In FIG. 9, a liquid crystal 5 and a counter substrate 6 are not shown. For this reason, a planar structure of a pixel portion in a TFT substrate 4 is shown. On the other hand, FIG. 10 shows the liquid crystal 5 and the counter substrate 6 in addition to the TFT substrate 4.

In the third preferred embodiment, an extending direction of a slit 200 in a counter electrode 161 is set to be a direction which is different from a separating direction of an image in the multiple view liquid crystal display, that is, a vertical direction. Also in the present preferred embodiment, a region in which the design of the slit 200 in the counter electrode 161 is mutually different is provided in each pixel region. A first region and a second region are disposed. In the first region, a slit 203 having a great width is provided. In the second region, a slit 204 having a small width is provided. In other words, a relationship of W1>W2 is obtained, wherein the width of the slit 203 in the first region is represented by W1 and the width of the slit 204 in the second region is represented by W2. The first region is disposed on left and right ends in the pixel region (ends in the separating direction of the image), and the second region is disposed in the central part of the pixel region.

Figure 11A:
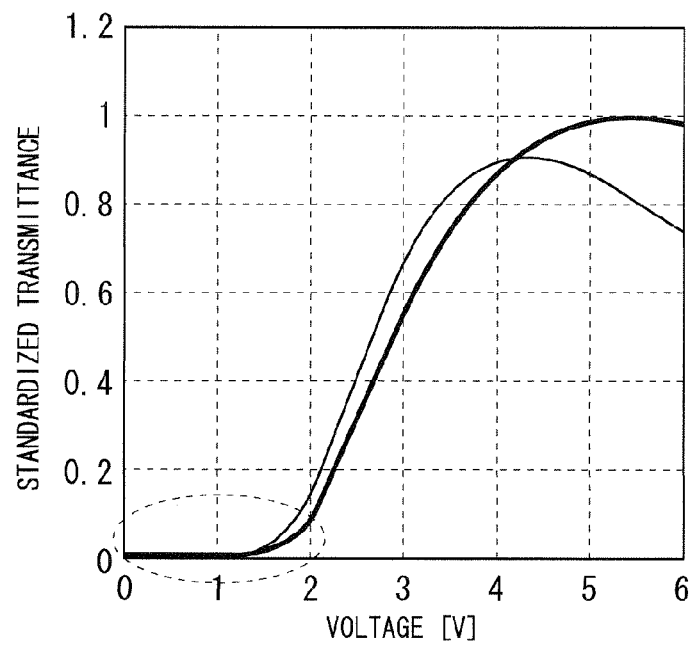
FIGS. 11A and 11B are graphs each showing an influence of a width of a slit of a counter electrode in a liquid crystal panel in an FFS mode on a transmittance-voltage characteristic of a liquid crystal layer.
Figure 11B:
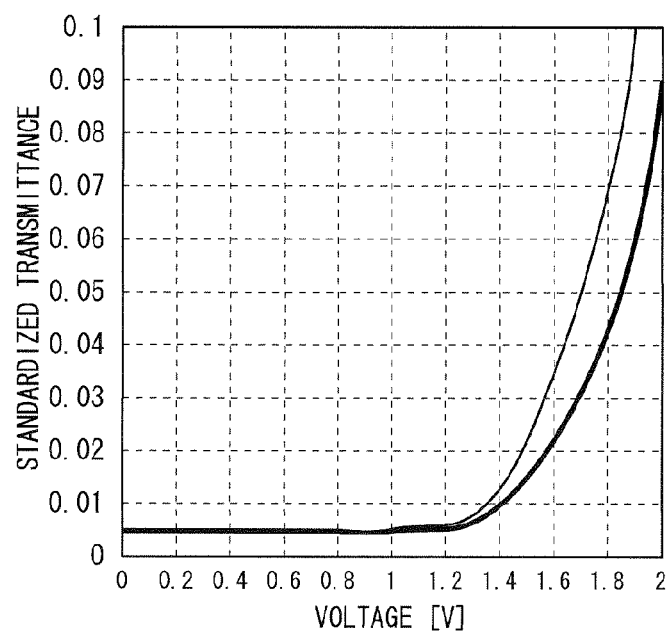

FIGS. 11A and 11B are graphs each showing an influence of the width of the slit of the counter electrode on a relationship between a driving voltage of a liquid crystal and a transmittance of the liquid crystal (a transmittance-voltage characteristic) in a liquid crystal panel in an FFS mode. A graph of FIG. 11B is obtained by enlarging a portion shown in an elliptical dotted line (a range in which a driving voltage is 0V to 2V) in the graph of FIG. 11A. FIGS. 11A and 11B show respective graphs in the case in which the width of the slit of the counter electrode is 3.5 µm and the case in which the width is 7.0 µm.

In the liquid crystal panel in the FFS mode, when the width of the slit of the counter electrode is increased, the transmittance of the liquid crystal with a low driving voltage is increased. With the pixel having the slits 203 and 204 shown in FIG. 9, accordingly, the transmittance is higher at the end of the pixel region provided with the slit 203 having the great width (the first region) than the central part provided with the slit 204 having the small width when black display is carried out. Therefore, it is possible to obtain the same effect as that in the first preferred embodiment.

Since a method of manufacturing the TFT substrate 4 according to the third preferred embodiment may be the same as that in the first preferred embodiment except for a difference in the pattern of the slit to be provided on the counter electrode 161, description will be omitted.

<Fourth Preferred Embodiment>

Figure 12:
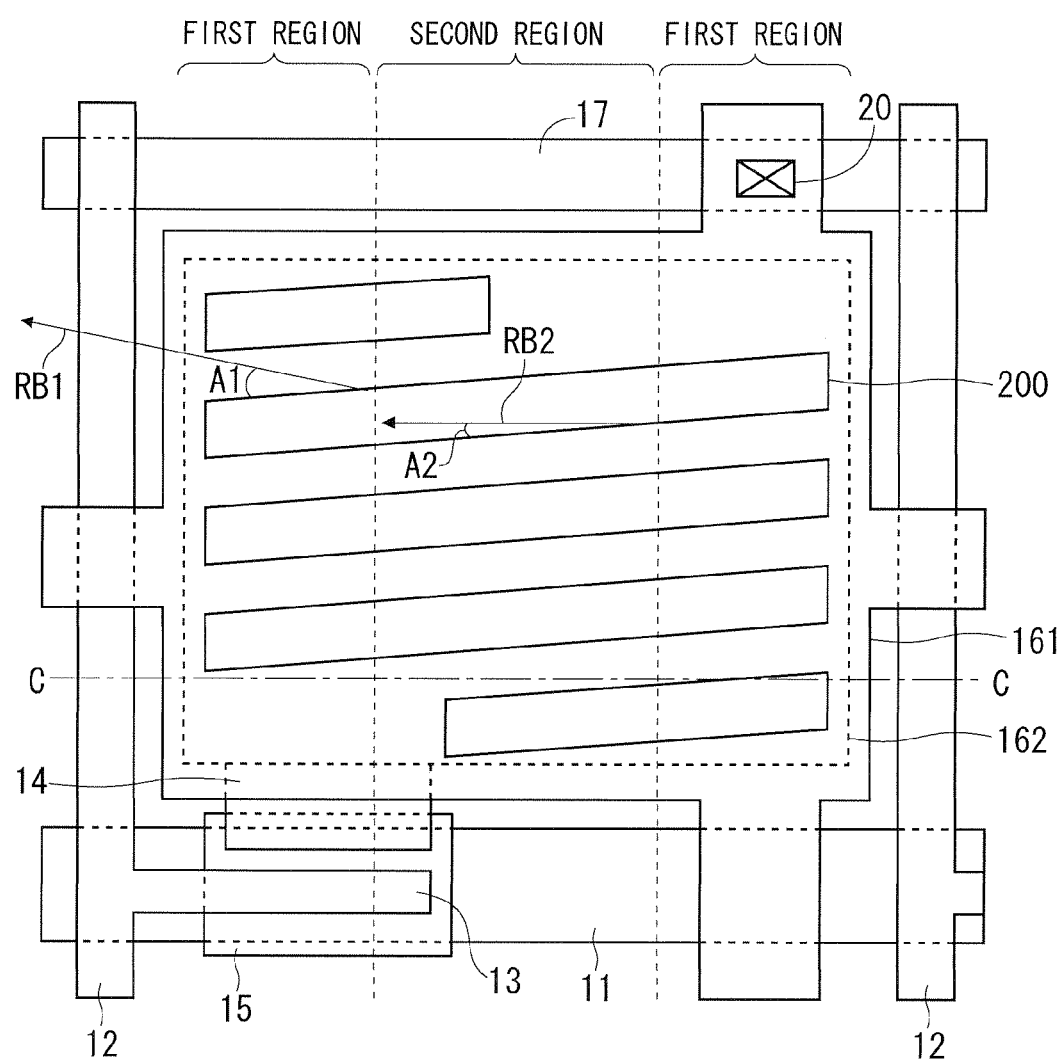
FIG. 12 is a plan view showing a structure of a pixel in a multiple view liquid crystal display according to a fourth preferred embodiment.
Figure 13:
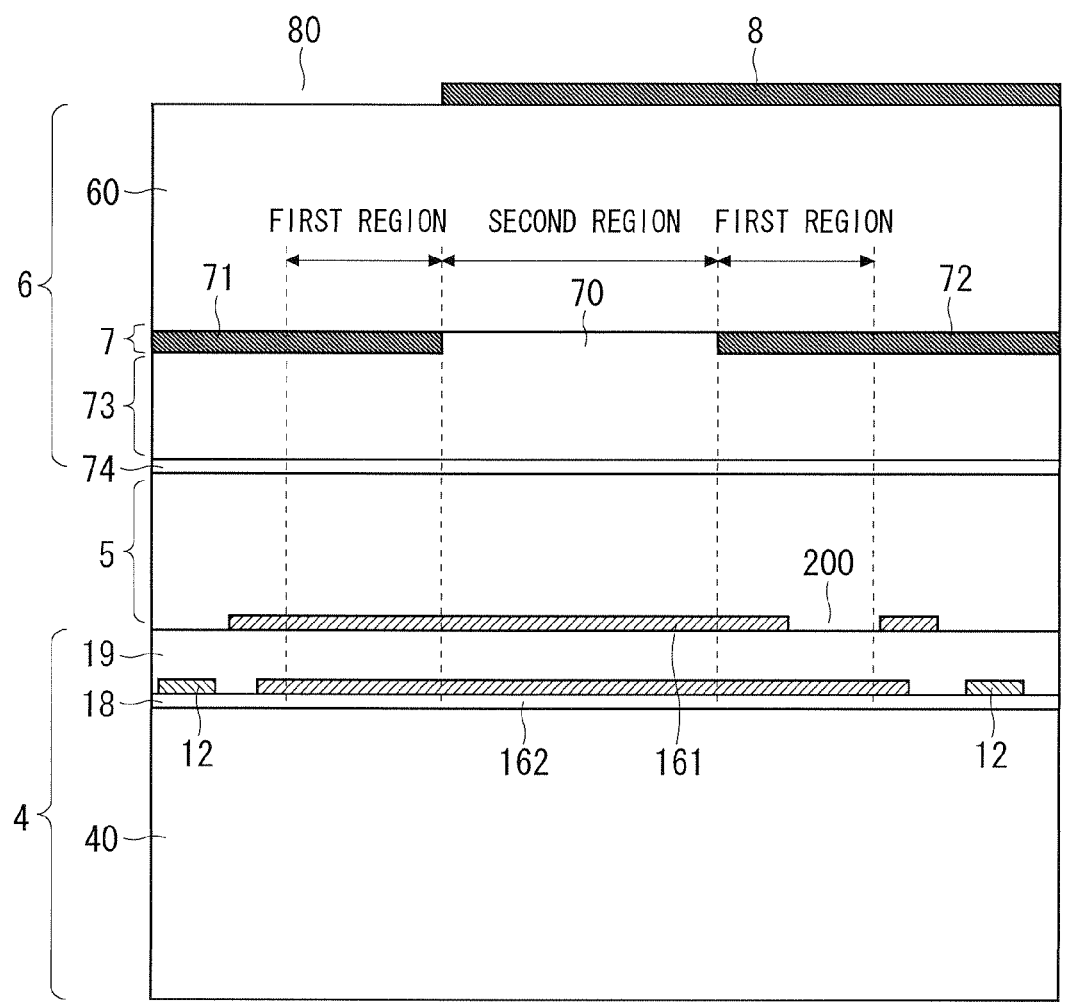
FIG. 13 is a sectional view showing the structure of the pixel in the multiple view liquid crystal display according to the fourth preferred embodiment.

FIGS. 12 and 13 are views showing a structure of a pixel in a multiple view liquid crystal display according to a fourth preferred embodiment. FIG. 12 is a plan view showing the pixel and FIG. 13 is a sectional view taken along a C-C line illustrated in FIG. 12. In FIG. 12, a liquid crystal 5 and a counter substrate 6 are not shown. For this reason, a planar structure of a pixel portion in a TFT substrate 4 is shown. On the other hand, FIG. 13 shows the liquid crystal 5 and the counter substrate 6 in addition to the TFT substrate 4.

In the fourth preferred embodiment, a slit 200 of a counter electrode 161 is caused to take a linear shape which is continuous from the vicinity of a right end to the vicinity of a left end in the counter electrode 161, and a rubbing direction is varied in a first region and a second region. In other words, an extending direction of the slit 200 is set to be identical in the first region and the second region, and a rubbing direction RB1 in the first region is made different from a rubbing direction RB2 in the second region. Similarly, the first region is disposed at left and right ends in a pixel region (ends in a separating direction of an image) and the second region is disposed in a central part of the pixel region.

In the fourth preferred embodiment, the rubbing direction is varied in the first region and the second region to cause an angle A1 formed by the extending direction of the slit 200 in the first region and the rubbing direction RB1 to be greater than an angle A2 formed by the extending direction of the slit 200 in the second region and the rubbing direction RB2 (that is, A1>A2).

As a result, in the same manner as in the first preferred embodiment, a transmittance is higher at the end of the pixel region having the greater angle formed by the extending direction of the slit 200 and the rubbing direction (the first region) than the central part having the smaller angle when the black display is carried out. Accordingly, it is possible to obtain the same effect as that in the first preferred embodiment.

Moreover, the shape of the slit 200 can be linear. In a rectangular pixel region, therefore, it is possible to generally lessen a region in which the slit cannot be disposed, thereby providing the slit 200 in the whole pixel region. The effect can also be obtained in the second preferred embodiment. However, it is not necessary to divide the slit in the first region and the second region and the slit is also provided in a boundary portion between the first region and the second region. Referring to uniformity of the transmittance of the liquid crystal 5 in the first region and increase in a light utilization efficiency, therefore, it is possible to expect a greater effect than that in the second preferred embodiment.

In the same manner as in the first preferred embodiment, it is preferable that the angle A1 formed by the extending direction of the slit 200 and the rubbing direction RB in the first region and the angle A2 formed by the extending direction of the slit 200 and the rubbing direction RB2 in the second region should be 0 degree<A1<15 degrees and 5 degrees<A2<30 degrees, respectively.

A method of manufacturing the TFT substrate 4 according to the fourth preferred embodiment may be the same as that in the first preferred embodiment except for a difference in the pattern of the slit provided in the counter electrode 161. However, it is necessary to carry out liquid crystal alignment processing in different direction for the first region and the second region over an alignment film provided on the surface of the TFT substrate 4. For example, in the case in which rubbing processing is executed as the liquid crystal alignment processing for the alignment film, it is possible to use a mask rubbing method of performing selective rubbing processing by providing a mask every region. Also in the case in which an optical alignment method or the like other than the rubbing method is used, moreover, it is possible to employ a selective method using the mask.

<Fifth Preferred Embodiment>

Figure 14:
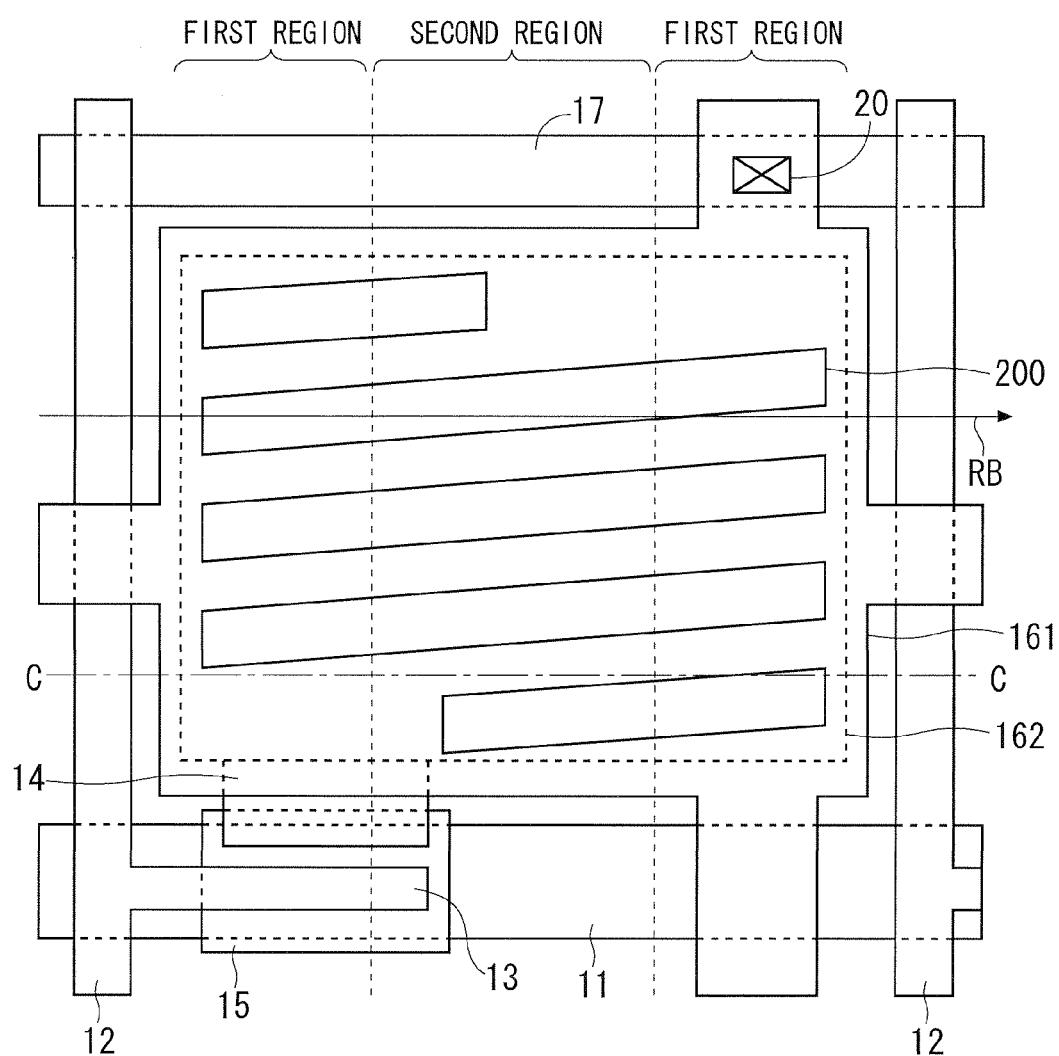
FIG. 14 is a plan view showing a structure of a pixel in a multiple view liquid crystal display according to a fifth preferred embodiment.
Figure 15:
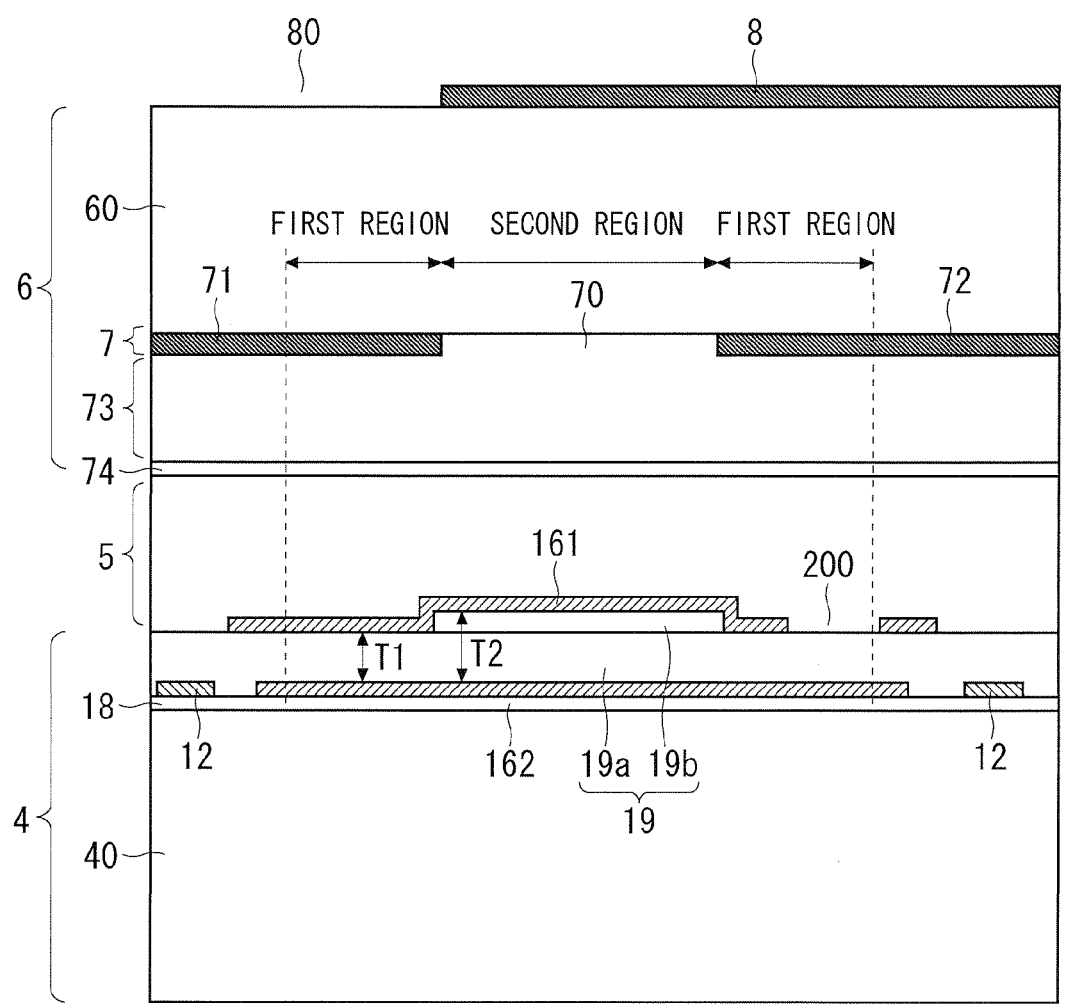
FIG. 15 is a sectional view showing the structure of the pixel in the multiple view liquid crystal display according to the fifth preferred embodiment.

FIGS. 14 and 15 are views showing a structure of a pixel in a multiple view liquid crystal display according to a fifth preferred embodiment. FIG. 14 is a plan view showing the pixel and FIG. 15 is a sectional view taken along a C-C line illustrated in FIG. 14. In FIG. 14, a liquid crystal 5 and a counter substrate 6 are not shown. For this reason, a planar structure of a pixel portion in a TFT substrate 4 is shown. On the other hand, FIG. 15 shows the liquid crystal 5 and the counter substrate 6 in addition to the TFT substrate 4.

In the fifth preferred embodiment, a thickness of an interlayer insulation film 19 between a pixel electrode 162 and a counter electrode 161 is varied in a first region and a second region, and a thickness T1 of an interlayer insulation film 19 in the first region is set to be smaller than a thickness T2 of the interlayer insulation film 19 in the second region (T1<T2). In the present preferred embodiment, the interlayer insulation film 19 in the first region is set to have a single layer structure of an insulation film 19*a* and the interlayer insulation film 19 in the second region is set to have a two-layer structure in which an insulation film 19*b* is superposed on the insulation film 19*a*. Thus, the relationship of T1<T2 can be obtained.

Figure 16A:
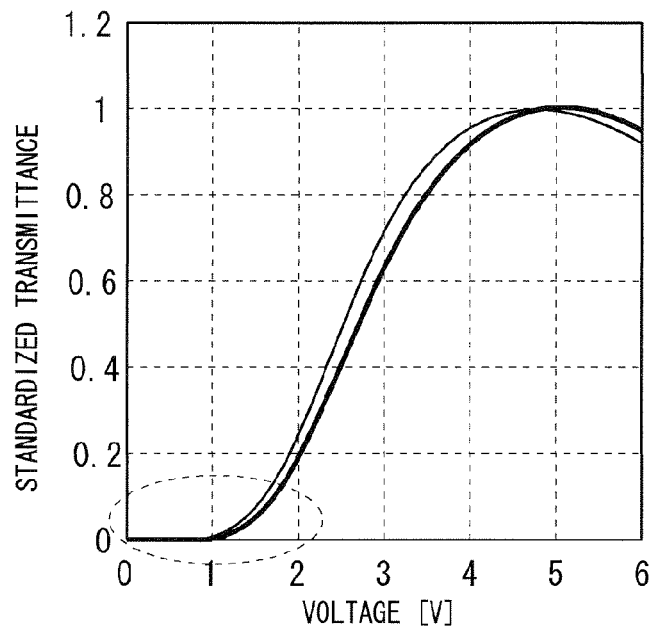
FIGS. 16A and 16B are graphs each showing an influence of a thickness of an interlayer insulation film between a pixel electrode and a counter electrode in a liquid crystal panel in an FFS mode on a transmittance-voltage characteristic of a liquid crystal layer.
Figure 16B:
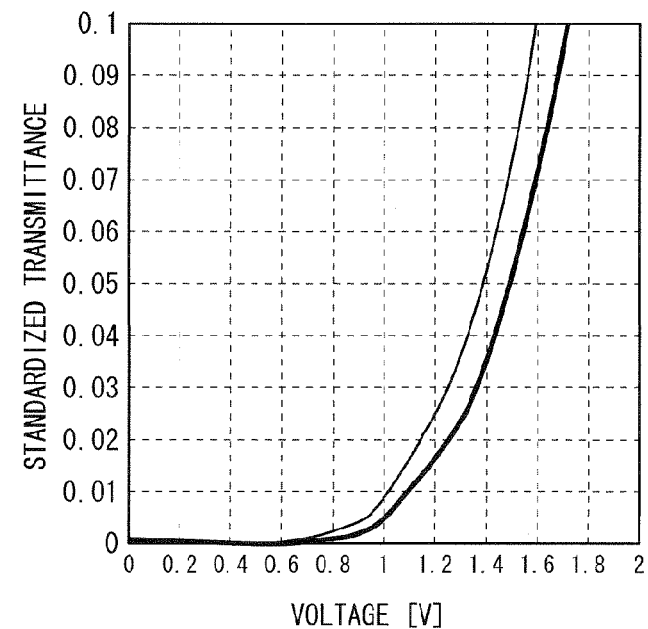

FIGS. 16A and 16B are graphs each showing an influence of the thickness of the interlayer insulation film between the pixel electrode and the counter electrode on a relationship between a driving voltage of a liquid crystal and a transmittance of the liquid crystal (a transmittance-voltage characteristic) in a liquid crystal panel in an FFS mode. A graph of FIG. 16B is obtained by enlarging a portion shown in an elliptical dotted line (a range in which a driving voltage is 0V to 2V) in the graph of FIG. 16A. FIGS. 16A and 16B show respective graphs in the case in which the thickness of the interlayer insulation film is 0.4 μm and the case in which the thickness is 0.6 μm.

In the liquid crystal panel in the FFS mode, when the interlayer insulation film 19 is thinner (a distance between the counter electrode 161 and the pixel electrode 162 is smaller), an electric field intensity generated in application of the same voltage to the pixel electrode 162 is increased. Therefore, alignment of a liquid crystal is changed with a lower voltage so that a transmittance is increased. In a pixel having the interlayer insulation film 19 shown in FIG. 15, therefore, the transmittance is higher at the end of the pixel region provided with the thin interlayer insulation film 19 (the first region) than the central part provided with the thick interlayer insulation film 19 when black display is carried out. Therefore, it is possible to obtain the same effect as that in the first preferred embodiment.

A method of manufacturing the TFT substrate 4 according to the fifth preferred embodiment may be the same as that in the first preferred embodiment except for a difference in the pattern of the slit to be provided on the counter electrode 161 and a difference in the thickness of the interlayer insulation film 19. In the present preferred embodiment, a method of causing the interlayer insulation film 19 to have a two-layer structure including insulation films 19*a* and 19*b* and carrying out patterning over the insulation films 19*a* and 19*b* into different shapes from each other is employed for the method of forming the thicker interlayer insulation film 19 in the second region than that in the first region. In other words, the insulation film 19*b* is formed on the insulation film 19*a* and the insulation film 19*b* is then subjected to patterning in such a manner that the insulation film 19*b* is left only in the second region.

Also in the case in which the insulation film 19*a* is previously subjected to the patterning to be left only in the second region and the insulation film 19*b* is formed in the whole pixel region (both of the first region and the second region) in order to cover the insulation film 19*a* subjected to the patterning, alternatively, it is possible to form the interlayer insulation film 19 which is thicker in the second region than the first region.

Although an end face of the insulation film 19*b* left in the second region is almost perpendicular to an upper surface of the insulation film 19*a* in FIG. 15, it may be inclined to some degree. In the case in which a difference between the thicknesses T1 and T2 is set to be great, particularly, a step in that portion is enlarged so that the alignment processing is badly influenced. For this reason, it is preferable to incline the end face of the insulation film 19*b* in order to relieve the bad influence. In other words, it is preferable that the thick portion of the interlayer insulation film 19 should take a taper shape in which a bottom part is wider than an upper part. This is the same as in the case in which one of the insulation films 19*a* and 19*b* is subjected to the patterning.

<Variant>

In the first to fifth preferred embodiments, there are shown the examples in which the present invention is applied to the liquid crystal panel in the FFS mode in which the counter electrode 161 having the slit (the opening portion) is disposed above the plate-shaped pixel electrode 162 through the interlayer insulation film 19. Referring to the liquid crystal panel in the FFS mode, conversely, it is also supposed to employ a structure in which the pixel electrode 162 having the slit (the opening portion) is disposed above the plate-shaped counter electrode 161. The present invention can also be applied to the latter structure in addition to the former structure.

In the case of the latter structure, by setting the relationship between the extending direction of the slit provided on the pixel electrode 162 and the rubbing direction to be the same as the relationship between the extending direction of the slit provided on the counter electrode 161 and the rubbing direction in the first to fourth preferred embodiments, it is possible to obtain the same effects as those in the first to fourth preferred embodiments. If the thickness of the interlayer insulation film provided between the counter electrode 161 to be the lower layer and the pixel electrode 162 to be the upper layer is set to be greater in the central part of the pixel region (the second region), moreover, it is possible to obtain the same effect as that in the fifth preferred embodiment.

In other words, the first to fifth preferred embodiments can be applied to a liquid crystal panel with a structure (the FFS mode) including an electrode to be a lower layer and an electrode to be an upper layer having a slit for generating a fringe electric field therewith in each pixel region.

Moreover, the present invention can also be applied to a liquid crystal panel in a horizontal electric field mode other than the FFS mode or a liquid crystal panel in a VA (Vertical Alignment) mode. In other words, also in the multiple view liquid crystal display of the parallax barrier type using the liquid crystal panel in the normally black mode, it is possible to reduce the visibility of a crosstalk without decreasing a contrast ratio within a visual field range on a practical use basis by defining a first region (an end of a pixel region) for emitting light contributing to the crosstalk and a second region (a central part of the pixel region) for emitting light in a front direction of a screen in each pixel based on a positional relationship between a parallax barrier and an opening and regulating voltage-transmittance characteristics in the first region and the second region in such a manner that a luminance in the first region is higher than that in the second region when black display is carried out.

While the invention has been shown and described in detail, the foregoing description is in all aspects illustrative and not restrictive. It is therefore understood that numerous modifications and variations can be devised without departing from the scope of the invention.

What is claimed is:

1. A multiple view liquid crystal display that displays at least two images in different separating directions, said display comprising:
    a liquid crystal panel in a normally black mode, said liquid crystal panel including a black matrix for defining a region of each pixel of said liquid crystal panel; and
    a parallax barrier provided on a front surface of said liquid crystal panel, said parallax barrier including a light shielding film having opening portions through which light emitted from said pixel in the at least two images passes in a corresponding one of the separating directions,
    wherein said pixel of said liquid crystal panel includes an electrode provided with a plurality of slits for generating a fringe electric field, each of said plurality of slits being a continuous slit that includes first regions that abut opposite ends of a second region, said second region having a different voltage-transmittance characteristic from said first regions,
    one of said first regions in each of said plurality of slits includes an end of said pixel in the corresponding one of the separating directions,
    another of said first regions in each of said plurality of slits includes another end of said pixel in the corresponding one of the separating directions,
    said first regions are disposed under a light shielding portion of said black matrix when viewed in plan view,
    said second region includes a central part of said pixel,
    said first regions have a voltage-transmittance characteristic having a higher transmittance than a transmittance in said second region when low luminance display is carried out,
    said pixel of said liquid crystal panel includes a second electrode disposed opposite to said electrode through an insulation film for generating a fringe electric field,
    in said first regions, each of said plurality of slits and said second electrode are disposed under said light shielding portion of said black matrix when viewed in plan view, and
    said continuous slit is entirely disposed in a forming region of said second electrode when viewed in plan view.

2. The multiple view liquid crystal display according to claim 1, wherein,
    said liquid crystal panel includes two substrates interposing a liquid crystal therebetween and said substrate on a side where said electrode is disposed is provided with an alignment film subjected to liquid crystal alignment processing in a predetermined direction, and
    an angle formed by an extending direction of each of said plurality of slits in at least one of said first regions and a direction of said liquid crystal alignment processing is greater than an angle formed by an extending direction of each of said plurality of slits in said second region and a direction of said liquid crystal alignment processing.

3. The multiple view liquid crystal display according to claim 2, wherein said direction of said liquid crystal alignment processing is identical in said at least one of said first regions and said second region, and
    said extending direction of each of said plurality of slits is different between said at least one of said first regions and said second region.

4. The multiple view liquid crystal display according to claim 2, wherein each of said plurality of slits is bent in a boundary between said at least one of said first regions and said second region.

5. The multiple view liquid crystal display according to claim 2, wherein said extending direction of each of said plurality of slits is identical in said at least one of said first regions and said second region, and
    said direction of said liquid crystal alignment processing is different between said at least one of said first regions and said second region.

6. The multiple view liquid crystal display according to claim 1, wherein,
    said liquid crystal panel includes two substrates interposing a liquid crystal therebetween and said substrate on a side where said electrode is disposed is provided with an alignment film subjected to liquid crystal alignment processing in a predetermined direction, and
    a width of each of said plurality of slits provided in at least one of said first regions is greater than a width of each of said plurality of slits provided in said second region.

7. The multiple view liquid crystal display according to claim 1, wherein
    a thickness of said insulation film in said first regions is smaller than a thickness of said insulation film in said second region.

8. A multiple view liquid crystal display that displays at least two images in different separating directions, said display comprising:
    a liquid crystal panel in a normally black mode, said liquid crystal panel including a black matrix for defining a region of each pixel of said liquid crystal panel; and
    a parallax barrier provided on a front surface of said liquid crystal panel, said parallax barrier including a light shielding film having opening portions through which light emitted from said pixel in the at least two images passes in a corresponding one of the separating directions,
    wherein said pixel of said liquid crystal panel includes a first region and a second region which have different voltage-transmittance characteristics from each other,
    said first region includes an end of said pixel in the corresponding one of the separating directions, said first region being disposed under a light shielding portion of said black matrix when viewed in plan view, said second region includes a central part of said pixel,
said first region has a voltage-transmittance characteristic having a higher transmittance than a transmittance in said second region when low luminance display is carried out,
said pixel includes an electrode provided with at least one slit entirely disposed in said first region and at least one slit entirely disposed in said second region for generating a fringe electric field,
said liquid crystal panel includes two substrates interposing a liquid crystal therebetween and said substrate on a side where said electrode is disposed is provided with an alignment film subjected to liquid crystal alignment processing in a predetermined direction,
an angle formed by an extending direction of said at least one slit in said first region and a direction of said liquid crystal alignment processing is greater than an angle formed by an extending direction of said at least one slit in said second region and a direction of said liquid crystal alignment processing,
a gap exists between said at least one slit in said first region and said at least one slit in said second region such that said at least one slit in said first region is separated from said at least one slit in said second region in the corresponding one of the separating directions,
said pixel of said liquid crystal panel includes a second electrode disposed opposite to said electrode through an insulation film for generating a fringe electric field,
in said first region, each of said at least one slit and said second electrode are disposed under said light shielding portion of said black matrix when viewed in plan view, and
each of said at least one slits is entirely disposed in a forming region of said second electrode when viewed in plan view.

9. A multiple view liquid crystal display that displays at least two images in different separating directions, said display comprising:
a liquid crystal panel in a normally black mode, said liquid crystal panel including a black matrix for defining a region of each pixel of said liquid crystal panel; and
a parallax barrier provided on a front surface of said liquid crystal panel, said parallax barrier including a light shielding film having opening portions through which light emitted from said pixel in the at least two images passes in a corresponding one of the separating directions,
wherein said pixel of said liquid crystal panel includes an electrode provided with a plurality of slits for generating a fringe electric field, each of said plurality of slits being a continuous slit that includes first regions that abut opposite ends of a second region,
said second region having a different voltage-transmittance characteristic from said first regions,
one of said first regions in each of said plurality of slits includes an end of said pixel in the corresponding one of the separating directions,
another of said first regions in each of said plurality of slits includes another end of said pixel in the corresponding one of the separating directions,
at least one of said first regions includes a plurality of first portions of said plurality of slits positioned at a first angle relative to a direction of liquid crystal alignment processing, said first angle being greater than 0,
said first regions are disposed under a light shielding portion of said black matrix when viewed in plan view,
said second region includes a central part of said pixel, said second region including a plurality of second portions of said plurality of slits positioned at a second angle relative to the direction of liquid crystal alignment processing, said second angle being greater than 0 and having a different magnitude than a magnitude of said first angle relative to said direction of liquid crystal alignment processing,
said first regions have a voltage-transmittance characteristic having a higher transmittance than a transmittance in said second region when low luminance display is carried out,
said pixel of said liquid crystal panel further includes a second electrode disposed opposite to said electrode through an insulation film for generating a fringe electric field,
in said first regions, said plurality of first portions of said plurality of slits and said second electrode are disposed under said light shielding portion of said black matrix when viewed in plan view, and
said continuous slit is entirely disposed in a forming region of said second electrode when viewed in plan view.

10. A multiple view liquid crystal display that displays at least two images in different separating directions, said display comprising:
a liquid crystal panel in a normally black mode, said liquid crystal panel including a black matrix for defining a region of each pixel of said liquid crystal panel; and
a parallax barrier provided on a front surface of said liquid crystal panel, said parallax barrier including a light shielding film having opening portions through which light emitted from said pixel in the at least two images passes in a corresponding one of the separating directions,
wherein said pixel of said liquid crystal panel includes first regions and a second region which have different voltage-transmittance characteristics from each other,
said pixel includes an electrode provided with a plurality of slits entirely disposed in said first regions and a plurality of slits entirely disposed in said second region for generating a fringe electric field,
one of said first regions includes an end of said pixel in the corresponding one of the separating directions,
another of said first regions includes another end of said pixel in the corresponding one of the separating directions,
at least one of said first regions includes at least one first slit of said plurality of slits entirely disposed in said first regions, said first slit having a width in the corresponding one of the separating directions,
said first regions are disposed under a light shielding portion of said black matrix when viewed in plan view,
said second region includes a central part of said pixel, said second region including at least one second slit of said plurality of slits entirely disposed in said second region, said at least one second slit having a width in the corresponding one of the separating directions that is different from the width of said at least one first slit, and
said first regions have a voltage-transmittance characteristic having a higher transmittance than a transmittance in said second region when low luminance display is carried out, said pixel of said liquid crystal panel further includes a second electrode disposed opposite to said electrode through an insulation film for generating a fringe electric field, in said first regions, said first slit and said second electrode are disposed under said light shielding portion of said black matrix when viewed in plan view, and all of said plurality of slits of said electrode are entirely disposed in a forming region of said second electrode when viewed in plan view.

* * * * *